United States Patent
Reimers et al.

(10) Patent No.: US 9,708,428 B2
(45) Date of Patent: Jul. 18, 2017

(54) POLYMERIZATION USING A SPIRAL HEAT EXCHANGER

(71) Applicant: ExxonMobil Chemical Patents Inc., Baytown, TX (US)

(72) Inventors: Jay L Reimers, Houston, TX (US); Kevin W. Lawson, Houston, TX (US); Peijun Jiang, League City, TX (US); Gabor Kiss, Hampton, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/242,086

(22) Filed: Aug. 19, 2016

(65) Prior Publication Data

US 2017/0088647 A1    Mar. 30, 2017

Related U.S. Application Data

(60) Provisional application No. 62/234,518, filed on Sep. 29, 2015.

(51) Int. Cl.

| | | |
|---|---|---|
| *C08F 2/00* | (2006.01) | |
| *C08F 4/00* | (2006.01) | |
| *C08F 210/00* | (2006.01) | |
| *C08F 110/06* | (2006.01) | |
| *C08F 110/02* | (2006.01) | |
| *C08F 210/16* | (2006.01) | |

(52) U.S. Cl.
CPC ........ *C08F 210/16* (2013.01); *C08F 2400/00* (2013.01); *C08F 2500/08* (2013.01); *C08F 2800/20* (2013.01)

(58) Field of Classification Search
CPC . B01J 8/1836; C08F 10/02; C08F 2/06; C08F 110/02; C08L 23/04; C08L 23/06
USPC ............. 526/348, 351, 352, 90, 64; 422/131
See application file for complete search history.

(56) References Cited

U.S. PATENT DOCUMENTS

| | | |
|---|---|---|
| 4,679,621 A | 7/1987 | Michele |
| 5,977,251 A | 11/1999 | Kao et al. |
| 6,117,939 A | 9/2000 | Mathauer et al. |
| 6,585,034 B2 | 7/2003 | Oswald |
| 6,644,391 B1 | 11/2003 | Fourt et al. |
| 6,874,571 B2 | 4/2005 | Gueguen |
| 7,640,972 B2 | 1/2010 | Maupetit et al. |
| 8,075,845 B2 | 12/2011 | Gulener |
| 8,153,757 B2 | 4/2012 | Arich de Finetti et al. |
| 8,431,096 B2 | 4/2013 | Cheluget et al. |
| 8,573,290 B2 | 11/2013 | Blomgren |
| 8,622,030 B2 | 1/2014 | Lovato |
| 2002/0092646 A1 | 7/2002 | Kuhn et al. |

(Continued)

FOREIGN PATENT DOCUMENTS

| | | |
|---|---|---|
| EP | 0 926 161 | 6/1999 |
| EP | 2 269 727 | 1/2011 |

(Continued)

*Primary Examiner* — William Cheung

(57) ABSTRACT

This invention relates to a polymerization process for forming polymer comprising: contacting (typically in a solution or slurry phase), a monomer and a catalyst system in a reaction zone comprising at least one spiral heat exchanger and recovering polymer, wherein the monomer, the catalyst system and the polymer flow through the at least one spiral heat exchanger in a cross-flow direction relative to spirals of the at least one spiral heat exchanger.

25 Claims, 5 Drawing Sheets

FIG. 1B

(56) References Cited

U.S. PATENT DOCUMENTS

| | | |
|---|---|---|
| 2004/0244968 A1 | 12/2004 | Cook et al. |
| 2010/0008833 A1 | 1/2010 | Gulener |
| 2010/0170665 A1 | 7/2010 | Lovato |
| 2011/0196116 A1* | 8/2011 | Kiss ................ C08F 10/00 526/90 |

FOREIGN PATENT DOCUMENTS

| | | |
|---|---|---|
| EP | 2 365 270 | 9/2011 |
| WO | 97/36942 | 10/1997 |
| WO | 00/61644 | 10/2000 |
| WO | 2015/040522 | 3/2015 |

* cited by examiner

… (1)

POLYMERIZATION USING A SPIRAL HEAT EXCHANGER

PRIORITY

This invention claims priority to and the benefit of U.S. Patent Application Ser. No. 62/234,518, filed Sep. 29, 2015, which is herein incorporated by reference.

FIELD OF THE INVENTION

This invention relates to novel polymerization processes using at least one spiral heat exchanger.

BACKGROUND OF THE INVENTION

Polymerization processes for producing polymers, such as polyolefins, may be highly exothermic, thus, requiring removal of heat during the polymerization process. Typically, shell and tube heat exchangers have been used to remove heat from polymerization processes. For example, U.S. Pat. No. 5,977,251 generally discloses a polymerization process utilizing one or more shell and tube heat exchangers. However, there is a high pressure drop associated with shell and tube heat exchangers due to the high volume capacity needed to provide sufficient surface area for heat transfer in shell and tube heat exchangers. Also, a shell and tube heat exchanger may further require internal structures or static mixers to achieve an acceptable heat transfer coefficient, which increases the already high pressure drop resulting in limited recirculation rates and production rates.

WO 00/61644 discloses a method for continuously producing polymers comprised of vinyl aromatic compounds by means of mass polymerization or solvent polymerization, whereby the feed materials are fed into a spiral heat exchanger and are reacted therein. Other references of interest include: EP 0 926 161; WO 97/36942; U.S. Pat. No. 5,977,251; WO 2015/040522; U.S. Pat. No. 8,431,096; U.S. Pat. No. 8,153,757; and U.S. Pat. No. 8,153,757.

Thus, there is a need in the art for new and improved polymerization processes, which are capable of sufficient heat removal so as not to significantly affect production rates. It is therefore an object of the present invention to provide polymerization processes where the sufficient removal of heat from the reaction is achieved by heat exchangers with increased heat transfer capabilities, smaller footprints, and lower pressure drops.

SUMMARY OF THE INVENTION

This invention relates to a solution polymerization process for forming polymer comprising contacting, in a solution phase, a monomer, and a catalyst system in a reaction zone comprising at least one spiral heat exchanger and recovering polymer, wherein the monomer, the catalyst system, and polymer flow through the at least one spiral heat exchanger in a cross-flow direction relative to spirals of the at least one spiral heat exchanger.

DETAILED DESCRIPTION OF THE INVENTION

I. Definitions

Figures 1A, 1B:
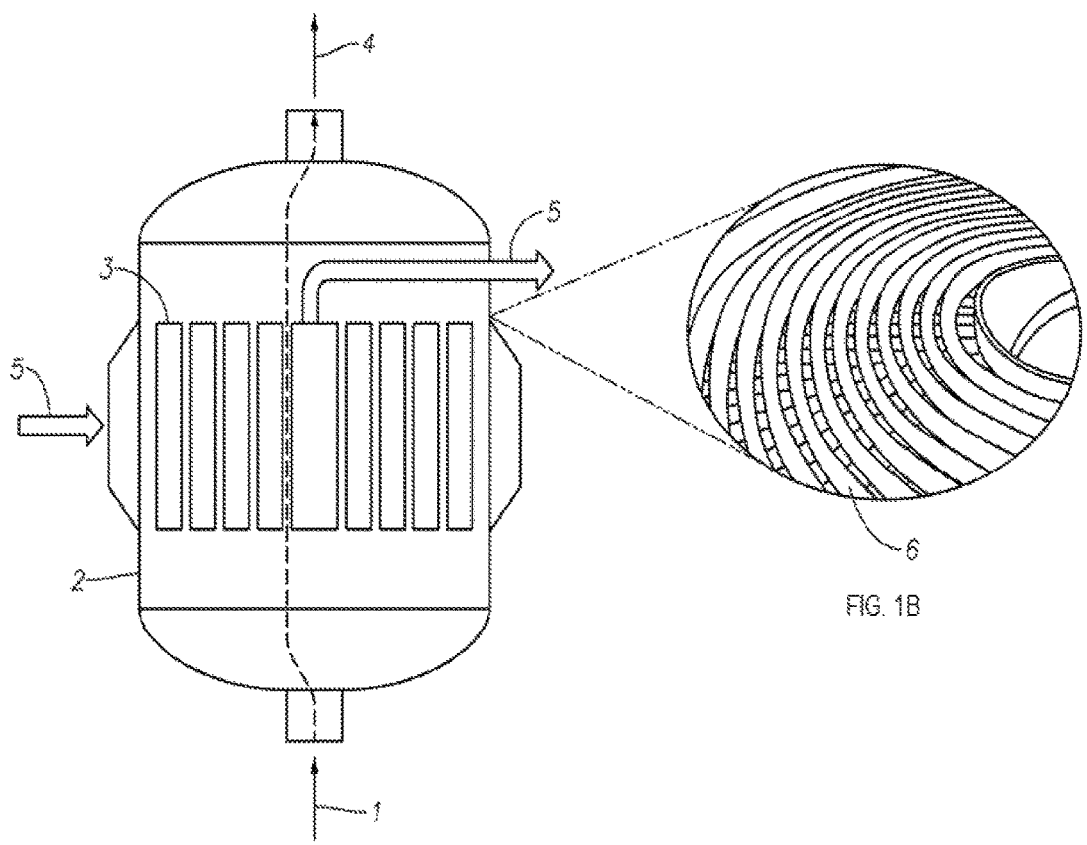
FIG. 1A illustrates a spiral heat exchanger in a reactor, according to an embodiment of the invention.
FIG. 1B illustrates a top view of the spiral heat exchanger in FIG. 1A.

To facilitate an understanding of the present invention, a number of terms and phrases are defined below.

As used in the present disclosure and claims, the singular forms "a," "an," and "the" include plural forms unless the context clearly dictates otherwise. The term "and/or" as used in a phrase such as "A and/or B" herein is intended to include "A and B," "A or B," "A," and "B."

For the purposes of this invention and the claims thereto, the new numbering scheme for the Periodic Table Groups is used as described in CHEMICAL AND ENGINEERING NEWS, 63(5), pg. 27 (1985). Therefore, a "group 4 metal" is an element from group 4 of the Periodic Table, e.g., Hf, Ti, or Zr.

As used herein, the phrase "at least a portion of" means >0 to 100.0 wt % of the composition to which the phrase refers. The phrase "at least a portion of" refers to an amount ≤about 1.0 wt %, ≤about 2.0 wt %, ≤about 5.0 wt %, ≤about 10.0 wt %, ≤about 20.0 wt %, ≤about 25.0 wt %, ≤about 30.0 wt %, ≤about 40.0 wt %, ≤about 50.0 wt %, ≤about 60.0 wt %, ≤about 70.0 wt %, ≤about 75.0 wt %, ≤about 80.0 wt %, ≤about 90.0 wt %, ≤about 95.0 wt %, ≤about 98.0 wt %, ≤about 99.0 wt %, or ≤about 100.0 wt %. Additionally or alternatively, the phrase "at least a portion of" refers to an amount ≥about 1.0 wt %, ≥about 2.0 wt %, ≥about 5.0 wt %, ≥about 10.0 wt %, ≥about 20.0 wt %, ≥about 25.0 wt %, ≥about 30.0 wt %, ≥about 40.0 wt %, ≥about 50.0 wt %, ≥about 60.0 wt %, ≥about 70.0 wt %, ≥about 75.0 wt %, ≥about 80.0 wt %, ≥about 90.0 wt %, ≥about 95.0 wt %, ≥about 98.0 wt %, ≥about 99.0 wt %, or about 100.0 wt %. Ranges expressly disclosed include combinations of any of the above-enumerated values; e.g., about 10.0 to about 100.0 wt %, about 10.0 to about 98.0 wt %, about 2.0 to about 10.0 wt %, about 40.0 to 60.0 wt %, etc.

A "reaction zone," also referred to as a "polymerization zone," is a vessel where polymerization takes place, for example, a batch reactor or continuous reactor. When multiple reactors are used in either series or parallel configuration, each reactor may be considered as a separate reaction zone or a separate polymerization zone. Alternatively, a reactor may include one or more reaction zones or polymerization zones. For a multi-stage polymerization in both a batch reactor and a continuous reactor, each polymerization stage is considered as a separate polymerization zone.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this invention, ethylene shall be considered an α-olefin.

For purposes of this invention and claims thereto, unless otherwise indicated, the term "substituted" means that a hydrogen group has been replaced with a heteroatom, or a heteroatom-containing group. For example, a "substituted hydrocarbyl" is a radical made of carbon and hydrogen where at least one hydrogen is replaced by a heteroatom or heteroatom-containing group.

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, and Mz) are g/mol. The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, MAO is methylalumoxane, dme is 1,2-dimethoxyethane, TMS is trimethylsilyl, TIBAL is tri-isobutylaluminum, TNOAL is tri(n-octyl)aluminum, THF (also referred to as thf) is tetrahydrofuran, RT is room temperature (and is 25° C. unless otherwise indicated), tol is toluene, EtOAc is ethyl acetate, Np is neopentyl, and Cy is cyclohexyl.

A "catalyst system" is the combination of at least one catalyst compound, at least one activator, and an optional co-activator. For the purposes of this invention and the claims thereto, when catalyst systems are described as comprising neutral stable forms of the components, it is well understood by one of ordinary skill in the art, that the ionic form of the component is the form that reacts with the monomers to produce polymers. When "catalyst system" is used to describe such a catalyst/activator before activation, it means the unactivated catalyst complex (precatalyst) together with an activator, support and, optionally, a co-activator. When it is used to describe such after activation, it means the support, the activated complex, and the activator or other charge-balancing moiety. The transition metal compound may be neutral as in a precatalyst, or a charged species with a counter ion as in an activated catalyst system.

In the description herein, the metallocene catalyst may be described as a catalyst precursor, a pre-catalyst compound, metallocene catalyst compound or a transition metal compound, and these terms are used interchangeably. A metallocene catalyst is defined as an organometallic compound bonded to least one n-bound cyclopentadienyl moiety (or substituted cyclopentadienyl moiety) and more frequently two n-bound cyclopentadienyl moieties or substituted cyclopentadienyl moieties bound to a transition metal.

For purposes of this invention and claims thereto in relation to catalyst compounds, the term "substituted" means that a hydrogen group has been replaced with a hydrocarbyl group, a heteroatom, or a heteroatom-containing group or where at least one heteroatom has been inserted within a hydrocarbyl ring. For example, methyl cyclopentadiene (Cp) is a Cp group substituted with a methyl group. Indene and fluorene (and substituted variants thereof) are substituted cyclopentadiene groups.

An "anionic ligand" is a negatively charged ligand, which donates one or more pairs of electrons to a metal ion. A "neutral donor ligand" is a neutrally charged ligand, which donates one or more pairs of electrons to a metal ion.

"Alkoxy" or "alkoxide" refers to —O-alkyl containing from 1 to about 10 carbon atoms. The alkoxy may be straight-chain, branched-chain, or cyclic. Non-limiting examples include methoxy, ethoxy, propoxy, butoxy, isobutoxy, tert-butoxy, pentoxy, and hexoxy. "$C_1$ alkoxy" refers to methoxy, "$C_2$ alkoxy" refers to ethoxy, "$C_3$ alkoxy" refers to propoxy and "$C_4$ alkoxy" refers to butoxy.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" is defined to be $C_1$ to $C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, including their substituted analogues. Substituted hydrocarbyl radicals are radicals in which at least one hydrogen atom of the hydrocarbyl radical has been substituted with at least one heteroatom or heteroatom-containing group, such as halogen (such as Br, Cl, F, or I) or at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like, or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl, and the like, including their substituted analogues.

The term "aryl" or "aryl group" means a six carbon aromatic ring and the substituted variants thereof, including but not limited to, phenyl, 2-methyl-phenyl, xylyl, and 4-bromo-xylyl. Likewise, heteroaryl means an aryl group where a ring carbon atom (or two or thee ring carbon atoms) has been replaced with a heteroatom, preferably N, O,or S. As used herein, the term "aromatic" also refers to pseudoaromatic heterocycles, which are heterocyclic substituents that have similar properties and structures (nearly planar) to aromatic heterocyclic ligands, but are not by definition aromatic; likewise the term aromatic also refers to substituted aromatics.

Unless otherwise indicated, where isomers of a named alkyl, alkenyl, alkoxy, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has five ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

An oligomer is a polymer having a low molecular weight, such as an Mn of less than 25,000 g/mol, or less than 2,500 g/mol, or a low number of mer units, such as 75 mer units or less or 50 mer units or less.

The term "continuous" means a system that operates without interruption or cessation. For example, a continuous process to produce a polymer would be one where the reactants are continually introduced into one or more reactors and polymer product is continually withdrawn.

A "solution polymerization" means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva, and J. C. Pinto, Ind. Eng. Chem. Res., 29, 2000, 4627. A homogeneous polymerization process is defined to be a process where at least 90 wt % of the product is soluble in the reaction media.

A "bulk polymerization" means a polymerization process in which the monomers and/or comonomers being polymerized are used as a solvent or diluent using little or no inert solvent as a liquid or diluent. A small fraction of inert solvent might be used as a carrier for a catalyst and a scavenger. A bulk polymerization system contains less than 25 wt % of inert solvent or diluent, preferably less than 10 wt %, preferably less than 1 wt %, preferably 0 wt %. A bulk process is defined to be a process where monomer concentration in all feeds to the reactor is 70 vol % or more.

"Laminar" flow refers to flow of a fluid (e.g., gas, liquid) in parallel layers without disruption between the layers. Fluids may exhibit laminar flow near a solid boundary. "Near-laminar" flow refers to flow of a fluid in parallel layers with minimal disruption between the layers.

II. Polymerization Process

This invention relates to a polymerization process for forming polymer comprising contacting a monomer and a catalyst system in a reaction zone comprising at least one spiral heat exchanger and recovering polymer.

The polymerization processes described herein may be carried out in any manner known in the art. Any solution, suspension, slurry, bulk or gas phase polymerization process known in the art can be used. Such processes can be run in a batch, semi-batch, or continuous mode. Preferably, the polymerization process is continuous. Homogeneous polymerization processes (such as solution phase) are advantageous. Alternately, the polymerization process is a slurry process. As used herein, the term "slurry polymerization process" means a polymerization process where a supported catalyst is employed and monomers are polymerized on the supported catalyst particles and at least 95 wt % of polymer products derived from the supported catalyst are in granular form as solid particles (not dissolved in the diluent).

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalyst, are added. The suspension, including diluent, is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process must be operated above the reaction diluent critical temperature and pressure. Preferably, a hexane or an isobutane medium is employed.

In an embodiment, a preferred polymerization technique useful in the invention is referred to as a particle form polymerization, or a slurry process where the temperature is kept below the temperature at which the polymer goes into solution. Such technique is well known in the art, and described in, for instance, U.S. Pat. No. 3,248,179; which is incorporated herein by reference. The preferred temperature in the particle form process is within the range of about 85° C. to about 110° C.

Advantageously, the polymerization process is a solution polymerization process wherein the monomer and catalyst system are contacted in a solution phase and polymer is obtained therein. In various aspects, a solvent may be present during the polymerization process. Suitable diluents/solvents for polymerization include non-coordinating, inert liquids. Examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins, which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt %, based upon the weight of the solvents.

In a preferred embodiment, the feed concentration of the monomers and comonomers for the polymerization is 60 vol % or less, preferably 40 vol % or less, or preferably 20 vol % or less, based on the total volume of the feedstream. Preferably, the polymerization is run in a bulk process.

A. Spiral Heat Exchanger

Figure 2:
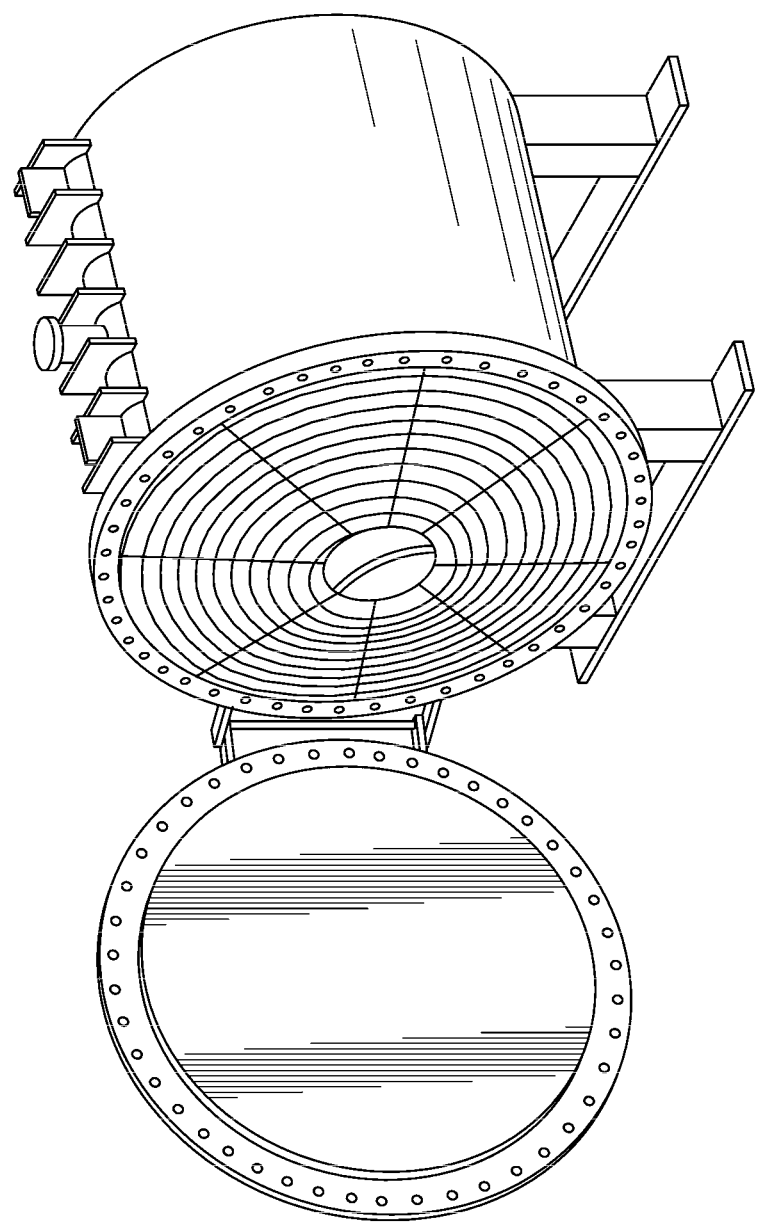
FIG. 2 illustrates a spiral heat exchanger, according to another embodiment of the invention.

In one embodiment, monomer and a catalyst system may enter a reaction zone comprising at least one spiral heat exchanger. As understood herein, the reaction zone may be a reactor. The monomer contacts the catalyst system thereby forming polymer. For example, as shown in FIG. 1A, a stream 1 comprising monomer and a catalyst system enters a reactor 2 and travels through a spiral heat exchanger 3. A stream 4 comprising polymer product, unreacted monomer, and quenched or unquenched catalyst system exits the reactor 2. A stream 5 comprising heat exchange medium flows through the spiral heat exchanger 3. As understood in the art, the at least one spiral heat exchanger includes a body formed by at least one spiral sheet wound to form spirals which are arranged radially around an axis of the spiral heat exchanger. The spirals form at least one flow channel for flow of a heat exchange medium and the spirals may be enclosed by a substantially cylindrical shell, as shown in FIG. 2. Further, the cylindrical shell may include at least one inlet and at least one outlet in fluid communication with the at least one flow channel for providing and removing the heat exchange medium.

In particular, the at least one spiral heat exchanger may be oriented in a direction, for example, as shown in FIG. 1B, such that the monomer, the catalyst system and polymer product flow in an axial direction through channels formed in between the spirals 6 of the at least one spiral heat exchanger thereby cooling the monomer, the catalyst system and polymer product as it travels through the at least one spiral heat exchanger. In other words, the monomer, the catalyst system and polymer product flow through the at least one spiral heat exchanger in a cross-flow direction relative to the spirals of the at least one spiral heat exchanger. As used herein, "cross-flow" direction refers to a flow substantially orthogonal in direction to the spirals of the at least one spiral heat exchanger. Substantially orthogonal may include flow of the monomer, catalyst system, and polymer product at an angle of about 70° to about 110°, preferably about 80° to about 100°, preferably about 85° to about 95°, more preferably about 88° to about 92°, more preferably about 90° with respect to the spirals of the at least one spiral heat exchanger.

As shown in FIG. 1B, the at least one spiral exchanger may be oriented in a substantially vertical direction where the monomer, the catalyst system and polymer product may flow in a substantially vertical direction through the at least one spiral heat exchanger. The orientation of the at least one spiral heat exchanger is not limited to such a vertical orientation, but rather may be oriented in any direction so long as the monomer, the catalyst system and polymer flow through the at least one spiral heat exchanger in a cross-flow direction relative to the spirals of the at least one spiral heat exchanger. For example, the at least one spiral heat exchanger may be oriented in a substantially horizontal direction, as shown in FIG. 2, where the monomer, the catalyst system, and polymer product may flow through the at least one spiral heat exchanger in a substantially horizontal direction.

Figure 3:
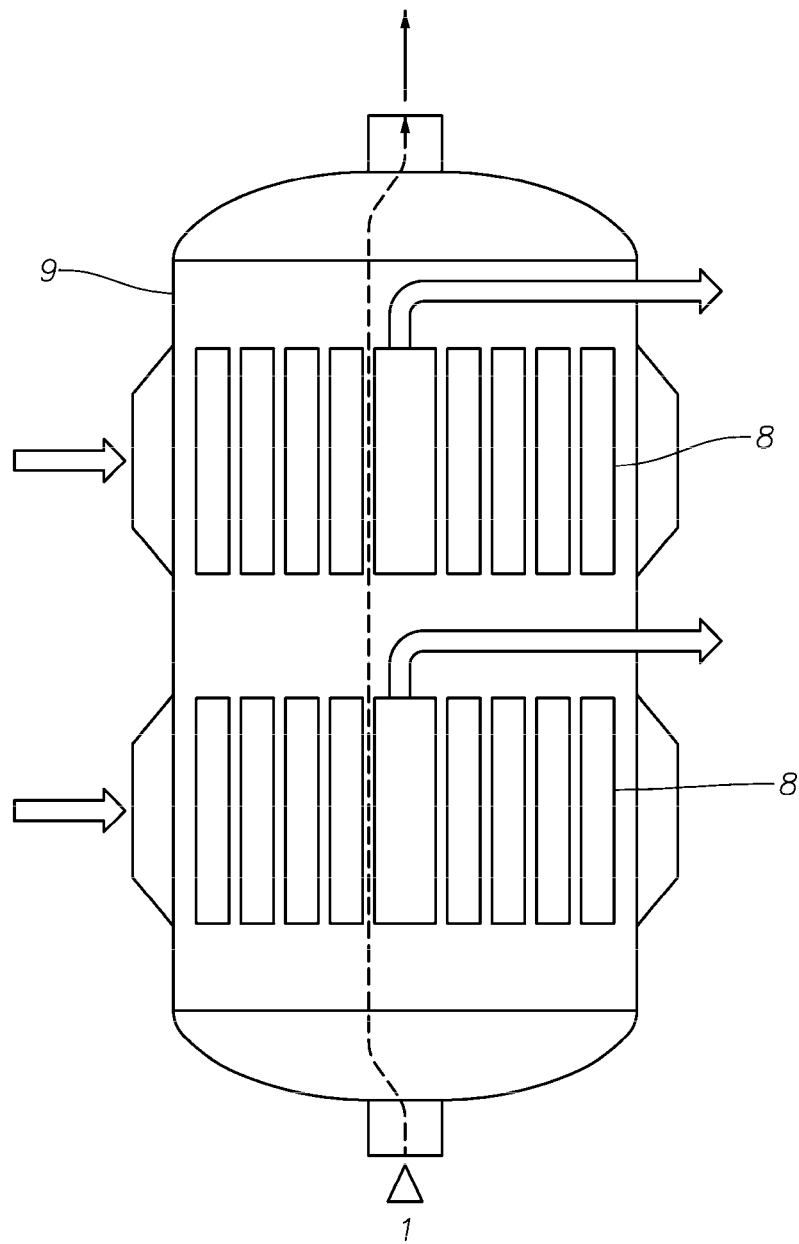
FIG. 3 illustrates two spiral heat exchangers in a reactor, according to another embodiment of the invention.
Figure 4:
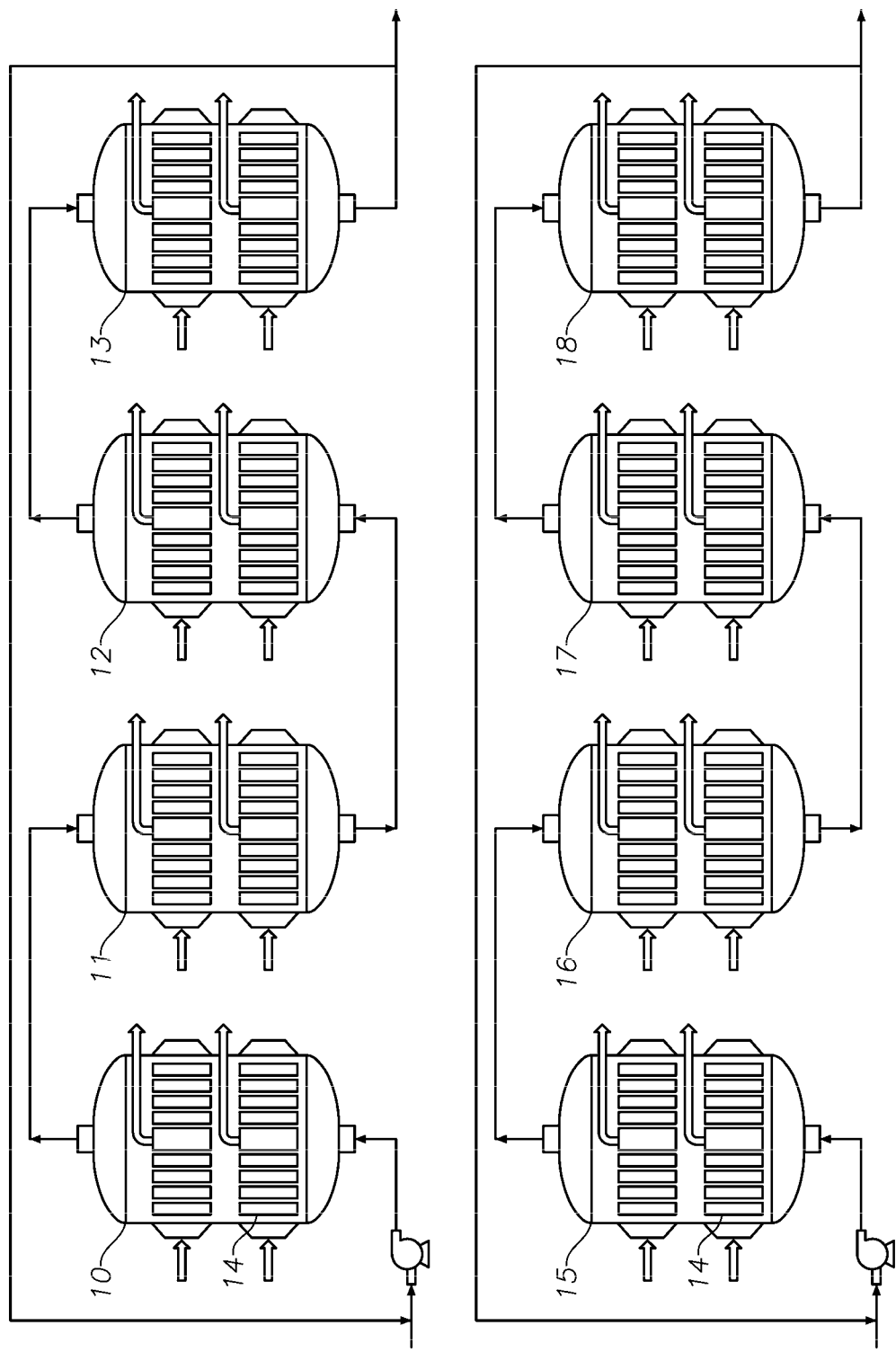
FIG. 4 illustrates multiple spiral heat exchangers, according to another embodiment of the invention.

Additionally or alternatively, the at least one spiral heat exchanger may comprise multiple spiral heat exchangers, e.g., at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, etc. The multiple spiral heat exchangers may be included in one reactor and/or in multiple reactors (e.g., 2, 3, 4, 5, 6, 7, 8 reactors). Each spiral heat exchanger in a reactor may be considered a separate reaction zone or stage, or multiple spiral heat exchangers in one reactor may cumulatively comprise one stage or reaction zone. For example, FIG. 3 shows two spiral heat exchangers 8 present in a reactor 9. The direction of reaction mass (e.g., monomer, catalyst system, polymer product, optional solvent, etc.) flow 1 is indicated by the dotted line. The multiple spiral heat exchangers may be connected in series and/or operated in parallel. For example, four reactors (reactors 10-13), connected in series, may each include two spiral heat exchangers 14, as shown in FIG. 4. Additionally, another four reactors (reactors 15-18), connected in series, may also each include two spiral heat exchangers 14 and operate in parallel with the reactors 10-13, as shown in FIG. 4. Preferably, the at least one spiral heat exchanger comprises at least eight spiral heat exchangers connected in series.

The at least one spiral heat exchanger used in the processes described herein may be any suitable spiral heat exchanger known in the art. Non-limiting examples of suitable spiral heat exchangers include those described in U.S. Pat. Nos. 8,622,030; 8,075,845; 8,573,290; 7,640,972; 6,874,571; 6,644,391; 6,585,034; 4,679,621; and US publications 2010/0170665; 2010/0008833; 2002/0092646; 2004/0244968, each of which are incorporated herein by reference. Additionally or alternatively, the at least one spiral heat exchanger may have a surface area to volume ratio of about 20-30 $ft^2/ft^3$.

Advantageously, the spiral heat exchanger may have an open channel height of 0.5 to 30 feet, preferably 1 to 25 feet, preferably 3 to 20 feet, preferably 5 to 15 feet, preferably 5 to 10 feet.

Suitable heat exchange medium is any typically used in the art that may flow through the spirals of the at least one spiral heat exchanger. Particularly useful heat exchange media are those stable at the reaction temperatures, and typically include those stable at 200° C. or more. Examples of heat transfer media include, inter alia, water and other aqueous solutions, oil (e.g., hydrocarbons, such as mineral oil, kerosene, hexane, pentane, and the like), and synthetic media, such as those available from The Dow Chemical Company (Midland, Mich.) under the trade name DOWTHERM™, such as grades A, G, J, MX, Q, RP, and T. If water is used, then it may be under a suitable amount of pressure to prevent boiling. Preferably, the heat exchange medium flows through the spirals at a temperature lower than a temperature of the monomer, the catalyst system and the polymer. Additionally, or alternatively, the heat exchange medium flows through the spirals at a temperature above a precipitation point of polymer. For example, the heat exchange medium may flow through the spirals at a temperature of about 100° C. to about 150° C., preferably about 120° C. to about 140° C., more preferably about 130° C.

In various aspects, the at least one spiral heat exchanger removes heat (e.g., produced during the polymerization reaction) at a rate of ≥about 100 Btu/hour·cubic foot·° F. (about 1,860 W/cubic meters·° C.), ≥about 150 Btu/hour·cubic foot·° F. (about 2,795 W/cubic meters·° C.), ≥about 200 Btu/hour·cubic foot·° F. (about 3,725 W/cubic meters·° C.), ≥about 250 Btu/hour·cubic foot·° F. (about 4,660 W/cubic meters·° C.), ≥about 300 Btu/hour·cubic foot·° F. (about 5,590 W/cubic meters·° C.), ≥about 350

Btu/hour·cubic foot·° F. (about 6,520 W/cubic meters·° C.), ≥about 400 Btu/hour·cubic foot·° F. (about 7,450 W/cubic meters·° C.), ≥about 450 Btu/hour·cubic foot·° F. (about 8,385 W/cubic meters·° C.), ≥about 500 Btu/hour·cubic foot·° F. (about 9,315 W/cubic meters·° C.), ≥about 550 Btu/hour·cubic foot·° F. (about 10,245 W/cubic meters·° C.), ≥about 600 Btu/hour·cubic foot·° F. (about 11,180 W/cubic meters·° C.), ≥about 650 Btu/hour·cubic foot·° F. (about 12,110 W/cubic meters·° C.), ≥about 700 Btu/hour·cubic foot·° F. (about 13,040 W/cubic meters·° C.), ≥about 750 Btu/hour·cubic foot·° F. (about 13,970 W/cubic meters·° C.), or ≥about 800 Btu/hour·cubic foot·° F. (about 14,905 W/cubic meters·° C.). Preferably, the at least one spiral heat exchanger removes heat at a rate of about ≥400 Btu/hour·cubic foot·° F. (about 7,450 W/cubic meters·° C.). Ranges expressly disclosed include combinations of any of the above-enumerated values, e.g., about 100 to about 800 Btu/hour·cubic foot·° F. (about 1,860 to about 14,905 W/cubic meters·° C.), about 200 to about 650 Btu/hour·cubic foot·° F. (about 3,725 to about 12,110 W/cubic meters·° C.), about 350 to about 550 Btu/hour·cubic foot·° F. (about 6,520 to about 10,245 W/cubic meters·° C.). Preferably, the at least one spiral heat exchanger removes heat at a rate of about 100 to about 800 Btu/hour cubic foot·° F. (about 1,860 to about 14,905 W/cubic meters·° C.), preferably about 200 to about 700 Btu/hour·cubic foot·° F. (about 3,725 to about 13,040 W/cubic meters·° C.), preferably about 300 to about 500 Btu/hour·cubic foot·° F. (about 5,590 to about 9,315 W/cubic meters·° C.).

Additionally, use of the at least one spiral heat exchanger in the polymerization process described herein advantageously results in a low pressure drop, which results in higher recirculation and production rates. For example, pressure drop across the at least one spiral heat exchanger may be ≤about 0.1 psi, ≤about 0.2 psi, ≤about 0.3 psi, ≤about 0.4 psi, ≤about 0.5 psi, ≤about 0.6 psi, ≤about 0.7 psi, ≤about 0.8 psi, ≤about 0.9 psi, ≤about 1.0 psi, ≤about 2.0 psi, ≤about 3.0 psi, ≤about 4.0 psi, ≤about 5.0 psi, ≤about 6.0 psi, ≤about 7.0 psi, ≤about 8.0 psi, ≤about 9.0 psi, ≤about 10.0 psi, ≤about 12.0 psi, ≤about 14.0 psi, ≤about 16.0 psi, ≤about 18.0 psi, or ≤about 20.0 psi. The pressure drop across the at least one spiral heat exchanger may be ≤about 10.0 psi, preferably ≤about 5.0 psi, more preferably ≤about 1.0 psi. Ranges expressly disclosed include combinations of any of the above-enumerated values, e.g., about 0.1 psi to about 20.0 psi, about 0.5 psi to about 16.0 psi, about 1.0 psi to about 12 psi, about 3.0 psi to about 8.0 psi, etc. Preferably, pressure drop across the at least one spiral heat exchanger is about 0.1 psi to about 14.0 psi, preferably about 0.5 psi to about 10.0 psi, preferably about 0.8 psi to about 2.0 psi, alternately from 0.2 to 0.8 psi per stage. Preferably, pressure drop across the all of the spiral heat exchangers in series is about 0.1 psi to about 14.0 psi, about 0.2 psi to about 10.0 psi, preferably about 0.5 psi to about 10.0 psi, more preferably about 0.8 psi to about 2.0 psi.

In various aspects, the monomer, the catalyst system, and polymer may be maintained substantially as a single liquid phase under polymerization condition. Preferably, the flow of the monomer, the catalyst system and polymer through the at least one spiral heat exchanger may be substantially laminar or near-laminar. Preferably, the Reynolds number of the flow of the combination of the solvent, the monomer/comonomer, the catalyst system and polymer may be ≥about 0.1, ≥about 1.0, ≥about 10.0, ≥about 20.0, ≥about 30.0, ≥about 40.0, ≥about 50.0, ≥about 60.0, ≥about 70.0, ≥about 80.0, ≥about 90.0, ≥about 100, ≥about 200, ≥about 300, ≥about 400, ≥about 500, ≥about 600, ≥about 700, ≥about 800, ≥about 900, ≥about 1,000, ≥about 1,100, ≥about 1,200, ≥about 1,300, ≥about 1,400, ≥about 1,500, ≥about 1,600, ≥about 1,700, ≥about 1,800, ≥about 1,900, ≥about 2,000, ≥about 2,100, or about 2,200. Additionally or alternatively, the Reynolds number of the flow solvent, the monomer/comonomer, the catalyst system, and polymer may be ≤about 40.0, ≤about 50.0, ≤about 60.0, ≤about 70.0, ≤about 80.0, ≤about 90.0, ≤about 100, ≤about 200, ≤about 300, ≤about 400, ≤about 500, ≤about 600, ≤about 700, ≤about 800, ≤about 900, ≤about 1,000, ≤about 1,100, ≤about 1,200, ≤about 1,300, ≤about 1,400, ≤about 1,500, ≤about 1,600, ≤about 1,700, ≤about 1,800, ≤about 1,900, ≤about 2,000, ≤about 2,100 or ≤about 2,200. Ranges expressly disclosed include combinations of any of the above-enumerated values, e.g., about 0.1 to about 2,200, about 1.0 to about 1,400, about 1.0 to about 100, about 50.0 to about 900, etc. Preferably, the Reynolds number of the combination of the solvent, the monomer/conomer, the catalyst system and polymer is about 0.1 to about 2,200, preferably about 1.0 to about 1,000, preferably about 1.0 to about 100, more preferably about 1.0 to about 50. Reynolds number is calculated using the hydraulic diameter (Dh) and the hydraulic diameter (Dh) is defined as Dh=4A/P where A is the cross-sectional area and P is the wetted perimeter of the cross-section of a channel in the spiral heat exchanger. Zero shear viscosity is used for Reynolds number calculation when a non-Newtonian fluid is used.

The polymerization processes may be conducted under conditions preferably including a temperature of about 50° C. to about 220° C., preferably about 70° C. to about 210° C., preferably about 90° C. to about 200° C., preferably from 100° C. to 190° C., preferably from 130° C. to 160° C. The polymerization process may be conducted at a pressure of from about 120 to about 1800 psi, preferably from 200 to 1000 psi, preferably from 300 to 800 psi. Preferably, the pressure is about 450 psia. Additionally, the polymerization process may be conducted with a recycle ratio of greater than zero to 50, preferably 1 to 40, preferably 2 to 30, preferably 5 to 20, preferably 5 to 15.

In various aspects, residence time in the spiral heat exchanger(s) may be up to 24 hours or longer, typically the residence time is from 1 minute to 15 hours, preferably from 2 minutes to 1 hour, preferably from 3 minutes to 30 minutes, preferably from about 5 to 25 minutes, or alternately from about 15 to 20 minutes. In another aspect, residence time in a single spiral heat exchanger may be up to 24 hours or longer, typically the residence time is from 1 minute to 15 hours, preferably from 2 minutes to 1 hour, preferably from 3 minutes to 30 minutes, preferably from about 5 to 25 minutes, or alternately from about 15 to 20 minutes. In another aspect, residence time in all of the spiral heat exchanger(s) connected in series may be up to 24 hours or longer, typically the residence time is from 1 minute to 15 hours, preferably from 2 minutes to 1 hour, preferably from 3 minutes to 30 minutes, preferably from about 5 to 25 minutes, or alternately from about 15 to 20 minutes.

In a some embodiments, hydrogen may be present during the polymerization process at a partial pressure of 0.001 to 50 psig (0.007 to 345 kPa), preferably from 0.01 to 25 psig (0.07 to 172 kPa), more preferably 0.1 to 10 psig (0.7 to 70 kPa). Alternatively, the hydrogen contentation in the feed is 500 wppm or less, preferably 200 wppm or less.

In various aspects, polymer may be produced at a rate of ≥about 2 pounds per hour per gallon of reactor volume (about 240 grams per hour per liter of reactor volume), ≥about 4 pounds per hour per gallon of reactor volume (about 480 grams per hour per liter of reactor volume), ≥about 5 pounds per hour per gallon of reactor volume (about 600 grams per hour per liter of reactor volume), ≥about 10 pounds per hour per gallon of reactor volume (about 1200 grams per hour per liter of reactor volume), ≥about 15 pounds per hour per gallon of reactor volume (about 1800 grams per hour per liter of reactor volume), ≥about 20 pounds per hour per gallon of reactor volume (about 2400 grams per hour per liter of reactor volume), ≥about 25 pounds per hour per gallon of reactor volume (about 3000 grams per hour per liter of reactor volume), ≥about 30 pounds per hour per gallon of reactor volume (about 3600 grams per hour per liter of reactor volume), ≥about 35 pounds per hour per gallon of reactor volume (about 4195 grams per hour per liter of reactor volume), ≥about 40 pounds per hour per gallon of reactor volume (about 4795 grams per hour per liter of reactor volume), ≥about 45 pounds per hour per gallon of reactor volume (about 5395 grams per hour per liter of reactor volume) or ≥about 50 pounds per hour per gallon of reactor volume (about 5990 grams per hour per liter of reactor volume). Preferably, polymer is produced at a rate of ≥about 5 pounds per hour per gallon of reactor volume (about 600 grams per hour per liter of reactor volume), ≥about 10 pounds per hour per gallon of reactor volume (about 1200 grams per hour per liter of reactor volume), or ≥about 20 pounds per hour per gallon of reactor volume (about 2400 grams per hour per liter of reactor volume). Ranges expressly disclosed include combinations of any of the above-enumerated values, e.g., about 2 to about 50 pounds per hour per gallon of reactor volume (about 240 to 5990 grams per hour per liter of reactor volume), about 5 to about 40 pounds per hour per gallon of reactor volume (about 600 to 4795 grams per hour per liter of reactor volume), about 10 to about 30 pounds per hour per gallon of reactor volume (about 1200 to 3600 grams per hour per liter of reactor volume), etc. Preferably, polymer is produced at a rate of about 2 to about 40 pounds per hour per gallon of reactor volume (about 240 to 4795 grams per hour per liter of reactor volume), preferably about 5 to about 30 pounds per hour per gallon of reactor volume (about 600 to 3600 grams per hour per liter of reactor volume), preferably about 10 to about 25 pounds per hour per gallon of reactor volume (about 1200 to 3000 grams per hour per liter of reactor volume).

Additionally or alternatively, the polymerization process may further comprise recycling at least a portion of the solvent, the monomer/comonomer, the catalyst system and polymer exiting the at least one spiral heat exchanger back through a spiral exchanger, which may be the same or different spiral heat exchanger. Polymer may be produced with a recycle ratio of ≥about 2, ≥about 5, ≥about 10, ≥about 15, ≥about 20, ≥about 25, ≥about 30, ≥about 35, ≥about 40, ≥about 45, ≥about 50, ≥about 55, or ≥about 60. Preferably, polymer may be produced with a recycle ratio of ≥about 5, ≥about 20, or ≥about 50. Additionally or alternatively, polymer may be produced with a recycle ratio of ≤about 2, ≤about 5, ≤about 10, ≤about 15, ≤about 20, ≤about 25, ≤about 30, ≤about 35, ≤about 40, ≤about 45, ≤about 50, ≤about 55, or ≤about 60. Ranges expressly disclosed include combinations of any of the above-enumerated values, e.g., about 2 to about 60, about 5 to about 50, about 20 to about 25, about 40 to about 60, etc. Preferably, polymer may be produced with a recycle ratio of about 2 to about 60, preferably about 5 to about 50, preferably about 6 to about 35, preferably about 8 to about 20. Additionally, the polymerization process may be conducted with a recycle ratio of greater than zero to 50, preferably 1 to 40, preferably 2 to 30, preferably 5 to 20, preferably 5 to 15, where the recycle ratio is defined to be the ratio between the flow rate of the recycle loop just prior to entry into the spiral heat exchanger (alone or in series) divided by the flow rate of fresh feed to the spiral heat exchanger (alone or in series).

The spiral heat exchanger types of reactor can be used in conjunction with other types of reactors such as CSTR, fluidized bed, loop, slurry and tubular reactor in a polymerization system. The reactors can be arranged in either series or parallel configurations. The polymerization system can be used to produce in-reactor blends of olefin polymers or copolymers.

B. Monomers

This invention can be used for polymerization of any monomers. Monomers useful herein include substituted or unsubstituted $C_2$ to $C_{40}$ olefins, preferably $C_2$ to $C_{20}$ olefins, preferably $C_2$ to $C_{12}$ olefins, preferably ethylene, propylene, butene, pentene, hexene, heptene, octene, nonene, decene, undecene, dodecene, and isomers thereof.

In an embodiment of the invention, the monomer comprises propylene and optional comonomers comprising one or more $C_2$ olefin (ethylene) or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

In another embodiment of the invention, the monomer comprises ethylene and optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment, one or more dienes are present in the polymer produced herein at up to 10 wt %, preferably at 0.00001 to 8.0 wt %, preferably 0.002 to 8.0 wt %, even more preferably 0.003 to 8.0 wt %, based upon the total weight of the composition. In some embodiments, 500 ppm or less of diene is added to the polymerization, preferably 400 ppm or less, preferably 300 ppm or less. In other embodiments, at least 50 ppm of diene is added to the polymerization, or 100 ppm or more, or 150 ppm or more.

Diolefin monomers useful in this invention include any hydrocarbon structure, preferably $C_4$ to $C_{30}$, having at least two unsaturated bonds, wherein at least one of the unsaturated bonds are readily incorporated into a polymer chain during chain growth. It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, 5-vinyl-2-norbornene, norbornadiene, 5-ethylidene-2-norbornene, divinylbenzene, dicyclopentadiene or higher ring containing diolefins with or without substituents at various ring positions.

C. Polymers

This invention also relates to polymer compositions of matter produced by the methods described herein.

In a preferred embodiment of the invention, the polymerization process described herein produces homopolymers and copolymers of one, two, three, four or more $C_2$ to $C_{40}$ olefin monomers, preferably $C_2$ to $C_{20}$ alpha olefin monomers. Particularly useful monomers include ethylene, propylene, butene, pentene, hexene, heptene, octene, nonene, decene, undecene, dodecene, isomers thereof, and mixtures thereof.

Likewise, the process of this invention produces olefin polymers, preferably polyethylene and polypropylene homopolymers and copolymers. In a preferred embodiment, the polymers produced herein are homopolymers of ethylene or homopolymers of propylene.

Alternately, the polymers produced herein are copolymers of a $C_2$ to $C_{40}$ olefin and one, two or three or more different $C_2$ to $C_{40}$ olefins, (where the $C_2$ to $C_{40}$ olefins are preferably $C_3$ to $C_{20}$ olefins, preferably are $C_3$ to $C_{12}$ alpha-olefin, preferably are propylene, butene, hexene, octene, decene, dodecene, preferably propylene, butene, hexene, octene, or a mixture thereof).

Alternately, the polymers produced herein are copolymers of ethylene preferably having from 0 to 25 mole % (alternately from 0.5 to 20 mole %, alternately from 1 to 15 mole %, preferably from 3 to 10 mole %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, or octene).

Alternately, the polymers produced herein are copolymers of propylene preferably having from 0 to 25 mol % (alternately from 0.5 to 20 mol %, alternately from 1 to 15 mol %, preferably from 3 to 10 mol %) of one or more of C2 or C4 to C20 olefin comonomers (preferably ethylene or C4 to C12 alpha-olefin, preferably ethylene, butene, hexene, octene, decene, dodecene, preferably ethylene, butene, hexene, or octene).

Polymers produced herein are in-reactor blends of two or more polymer components. The polymer components can be produced using multiple catalysts in a polymerization reactor and/or using multiple reactors either in series or parallel configurations. The composition, molecular weight and fraction of each polymer component in the blend can be controlled through reactor design and process conditions such as feed composition, reactor configuration, catalyst choice and temperature.

Typically, the polymers produced herein have a Mw of 5,000 to 1,000,000 g/mol (preferably 25,000 to 750,000 g/mol, preferably 50,000 to 500,000 g/mol), and/or a Mw/Mn of greater than 1 to 40 (alternately 1.2 to 20, alternately 1.3 to 10, alternately 1.4 to 5, 1.5 to 4, alternately 1.5 to 3).

In a preferred embodiment, the polymer produced herein has a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

Unless otherwise indicated Mw, Mn, MWD are determined by GPC as described in US 2006/0173123, pp. 24-25, paragraphs [0334] to [0341].

In a preferred embodiment, the polymer produced herein has a composition distribution breadth index (CDBI) of 50% or more, preferably 60% or more, preferably 70% or more. CDBI is a measure of the composition distribution of monomer within the polymer chains and is measured by the procedure described in PCT publication WO 93/03093, published Feb. 18, 1993, specifically columns 7 and 8, as well as in Wild et al, J. Poly. Sci., Poly. Phys. Ed., Vol. 20, p. 441, (1982) and U.S. Pat. No. 5,008,204, including that fractions having a weight average molecular weight (Mw) below 15,000 are ignored when determining CDBI.

The polymers may be stabilized and formed into pellets using conventional equipment and methods, such as by mixing the polymer and a stabilizer (such as antioxidant) together directly in a mixer, such as, for example, a single or twin-screw extruder and then pelletizing the combination. Additionally, additives may be included in the pellets. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

D. Polymer Blends

In another embodiment, the polymer (preferably the polyethylene or polypropylene) produced herein is combined with one or more additional polymers prior to being formed into a film, molded part, or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene or polypropylene) is present in the above blends, from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

E. Applications

Polymers produced in the inventive process are useful for various applications. In one embodiment, the polymer described herein may be shaped into desirable end use articles by any suitable means known in the art. They are particularly useful for making articles by molding process, including but not limited to, injection molding, gas-assisted injection molding, extrusion blow molding, injection blow molding, injection stretch blow molding, compression molding, rotational molding, foam molding, thermoforming, sheet extrusion, profile extrusion, elasto-welding and compression molding techniques. In another embodiment, the polymer described herein may be used to prepare nonwoven elastic articles and medical products. The nonwoven products described above may be used in articles such as hygiene products, including, but not limited to, diapers, feminine care products, and adult incontinent products. Desirable uses also include pipes and conduits, and other molded articles of manufacture. Other uses include membrane and film making, especially blown and cast films. The polymer described herein are useful for roofing applications, such as for thermoplastic polyolefin roofing membranes. Polymers produced by the process of the invention and blends thereof are useful in automotive applications. Alternatively, the polymer described herein can be used as adhesives for applications such as packaging, woodworking and lamination.

F. Catalyst System

Any known polymerization catalyst, for example a Ziegler-Natta catalyst system, chromium catalysts, metallocene catalyst system, pyridyldiamide catalyst or other singlesite catalysts, or a combination thereof including a bimetallic (i.e., Z/N and/or metallocene) catalyst, can be used in this invention. Preferred catalysts are those capable of polymerizing a C2 to C20 olefin to produce a polymer having a weight average molecular weight of 5,000 g/mol or more at a polymerization temperature of 60° C. or higher. The catalyst system used in the polymerization process described herein may comprise catalyst (e.g., olefin polymerization catalyst compound, such as metallocene compound, pyridyldiamido compound, etc.) and an activator. The catalyst (e.g., olefin polymerization catalyst compound, such as metallocene compound, pyridyldiamido compound, etc.) and activator may be combined in any order. For example, the catalyst (e.g., olefin polymerization catalyst compound, such as metallocene compound, pyridyldiamido compound, etc.) and the activator may be combined prior to contacting the monomer. Alternatively, the activator may be added to a solution of the monomer and the catalyst (e.g., olefin polymerization catalyst compound, such as metallocene compound, pyridyldiamido compound, etc.). Preferably, the activator and catalyst (e.g., olefin polymerization catalyst compound, such as metallocene compound, pyridyldiamido compound, etc.) are contacted to form the catalyst system prior to entering the at least one spiral heat exchanger, more preferably immediately before entering the at least one spiral heat exchanger. As used herein, "immediately" refers to a period of time of about 1 to about 120 seconds, preferably about 1 to about 60 seconds, preferably about 1 to about 30 seconds before the activator and the catalyst (e.g., olefin polymerization catalyst compound, such as metallocene compound, pyridyldiamido compound, etc.) enter the at least one spiral heat exchanger. Additionally or alternatively, the activator may be introduced to a recycle stream comprising the monomer, the catalyst system and the polymer.

The catalyst system may further comprise a support. Methods for making supported catalyst are well known to those skilled in the art. Typical support may be any support such as talc, an inorganic oxide, clay, and clay minerals, ion-exchanged layered compounds, diatomaceous earth, silicates, zeolites or a resinous support material such as a polyolefin. Specific inorganic oxides include silica and alumina, used alone or in combination with other inorganic oxides such as magnesia, titania, zirconia and the like. The inorganic oxides used as support are characterized as having an average particle size ranging from 30-600 microns, desirably from 30-100 microns, a surface area of 50-1,000 square meters per gram, desirably from 100-400 square meters per gram, a pore volume of 0.5-3.5 cc/g, desirably from about 0.5-2 cc/g.

The catalyst system may be dried and introduced into the spiral heat exchanger as a solid (such as a powder), suspended in mineral oil and introduced as a mineral oil slurry, combined with typical hydrocarbon solvent material (such as hexane, isopentane, etc.) and introduced as a suspension, or any other means typical in the art.

Metallocene Compounds

Metallocene catalysts are Group 3 to 6 organometallic compounds having ligands consisting of one to two cyclopentadienyl (Cp) radicals (which may be substituted or unsubstituted and may be the same or different) coordinated with a transition metal through pi bonding. The Cp groups may also include substitution by linear, branched or cyclic hydrocarbyl radicals and desirably cyclic hydrocarbyl radicals so as to form other contiguous ring structures, including, for example indenyl, azulenyl and fluorenyl groups. These additional ring structures may also be substituted or unsubstituted by hydrocarbyl radicals and desirably $C_1$-$C_{20}$ hydrocarbyl radicals.

Suitable metallocene catalysts are disclosed in, for example, U.S. Pat. Nos. 4,530,914; 4,542,199; 4,769,910; 4,808,561; 4,871,705; 4,933,403; 4,937,299; 5,017,714;

5,026,798; 5,057,475; 5,120,867; 5,132,381; 5,155,180; 5,198,401; 5,278,119; 5,304,614; 5,324,800; 5,350,723; 5,391,790; 5,436,305; 5,510,502; 5,145,819; 5,243,001; 5,239,022; 5,329,033; 5,296,434; 5,276,208; 5,672,668; 5,304,614; 5,374,752; 5,510,502; 4,931,417; 5,532,396; 5,543,373; 6,100,214; 6,228,795; 6,124,230; 6,114,479; 6,117,955; 6,087,291; 6,140,432; 6,245,706; 6,194,341; 7,141,632 and WO 97/32906; 98/014585; 98/22486; and 00/12565, US20150025209; each of which is incorporated by reference herein in its entirety.

Illustrative, but not limiting, examples of preferred mono-cyclopentadienyl metallocene compounds for use in the catalyst system include:

dimethylsilyl (tetramethylcyclopentadienyl)(cyclododecylamido)titanium dimethyl, dimethylsilyl (tetramethylcyclopentadienyl)(cyclododecylamido)titanium dichloride, dimethylsilyl (tetramethylcyclopentadienyl)(t-butylamido)titanium dimethyl, dimethylsilyl (tetramethylcyclopentadienyl)(t-butylamido)titanium dichloride, μ-$(CH_3)_2$Si(cyclopentadienyl)(1-adamantylamido)M(R)$_2$; μ-$(CH_3)_2$Si(3-tertbutylcyclopentadienyl)(1-adamantylamido)M(R)$_2$; μ-$(CH_3)_2$(tetramethylcyclopentadienyl)(1-adamantylamido)M(R)$_2$; μ-$(CH_3)_2$Si(tetramethylcyclopentadienyl)(1-adamantylamido)M(R)$_2$; μ-$(CH_3)_2$C(tetramethylcyclopentadienyl)(1-adamantylamido)M(R)$_2$; μ-$(CH_3)_2$Si(tetramethylcyclopentadienyl)(1-tert-butylamido)M(R)$_2$; μ-$(CH_3)_2$Si(fluorenyl)(1-tertbutylamido)M(R)$_2$, μ-$(CH_3)_2$Si(tetramethylcyclopentadienyl)(1-cyclododecylamido)M(R)$_2$; and μ-$(C_6H_5)_2$C(tetramethylcyclopentadienyl)(1-cyclododecylamido)M(R)$_2$;

where M is selected from a group consisting of Ti, Zr, and Hf and R is selected from halogen or $C_1$ to $C_5$ alkyl, preferably R is a methyl group.

Illustrative, but not limiting, examples of preferred bis-cyclopentadienyl metallocene compounds include:
Bis(tetrahydroindene)Hf Me$_2$;
Bis(1-butyl,3-methylcyclopentadienyl)ZrCl$_2$,
Bis-(n-butylcyclopentadienyl)ZrCl$_2$,
(Dimethylsilyl)$_2$O bis(indenyl)ZrCl$_2$;
Dimethylsilyl(3-(3-methylbutyl)cyclopentadienyl)(2,3,4,5-tetramethylcyclopentadienyl)ZrCl$_2$;
Dimethylsilylbis(tetrahydroindenyl)ZrCl$_2$;
Dimethylsilyl-(3-phenyl-indenyl)(tetramethylcyclopentadienyl)ZrCl$_2$;
Dimethylsilyl(3-neopentylcyclopentadienyl)(tetramethylcyclopentadienyl)HfCl$_2$;
Tetramethyldisilylene bis(4-(3,5-di-tert-butylphenyl)-indenyl)ZrCl$_2$; and
Cyclopentadienyl(1,3-diphenylcyclopentadienyl)ZrCl$_2$.

Particularly useful metallocenes include those selected from the group consisting of:
bis(cyclopentadienyl)zirconium dichloride, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium dichloride, bis(indenyl)zirconium dimethyl, bis(tetrahydro-1-indenyl)zirconium dichloride, bis(tetrahydro-1-indenyl)zirconium dimethyl, dimethylsilylbis(tetrahydroindenyl)zirconium dichloride, dimethylsilylbis(tetrahydroindenyl)zirconium dimethyl, dimethylsilylbis(indenyl)zirconium dichloride, dimethylsilyl(bisindenyl)zirconium dimethyl, dimethylsilylbis(cyclopentadienyl)zirconium dichloride, dimethylsilylbis(cyclopentadienyl)zirconium dimethyl, dimethylsilylbis(2-methyl-4-phenyl indenyl)zirconium dichloride, and dimethylsilylbis(2-methyl-4-phenyl indenyl)zirconium dimethyl.

Particularly useful metallocenes include those selected from the group consisting of:
bis(indenyl)zirconium dichloride; bis(indenyl)zirconium dimethyl; bis(indenyl)hafnium dichloride; bis(indenyl)hafnium dimethyl; 1,1'-bis(4-triethylsilylphenyl)methylene-(cyclopentadienyl)(3,8-di-tertiary-butyl-1-fluorenyl)hafnium dimethyl (assuming the bridge is considered the 1 position); and 1,1'-bis(4-triethylsilylphenyl)methylene-(cyclopentadienyl)(3,8-di-tertiary-butyl-1-fluorenyl)hafnium dichloride (assuming the bridge is considered the 1 position). For additional useful catalysts please see U.S. Pat. No. 6,506,857.

Particularly useful combinations of metallocene compounds include:
SiMe$_2$(Me$_4$Cp)(cC$_{12}$N)TiMe$_2$ and bis(1-Bu,3-Me-Cp)ZrCl$_2$; SiMe$_2$(Me$_4$Cp)(cC$_{12}$N)TiMe$_2$ and (SiMe$_2$) bis(indenyl)ZrCl$_2$; SiMe$_2$(Me$_4$Cp)(cC$_{12}$N)TiMe$_2$ and (SiMe$_2$)$_2$O bis(indenyl)ZrCl$_2$; SiMe$_2$(Me$_4$Cp)(cC$_{12}$N)TiMe$_2$ and (SiMe$_2$)$_2$O bis(indenyl)ZrMe$_2$; SiMe$_2$(Me$_4$Cp)(cC$_{12}$N)TiMe$_2$ and SiMe$_2$(3-neopentylCp)((Me$_4$Cp)HfCl$_2$; SiMe$_2$(Me$_4$Cp)(cC$_{12}$N)TiMe$_2$ and SiMe$_2$(3-neopentylcyclopentadienyl)(Me$_4$Cp)HfMe$_2$; SiMe$_2$(Me$_4$Cp)(1-adamantylamido)TiMe$_2$ and bis(1-Bu,3-MeCp)ZrCl$_2$; and SiMe$_2$(Me$_4$Cp)(1-t-butylamido)TiMe$_2$ and bis(1-Bu,3-MeCp)ZrCl$_2$.

Metallocene compounds that are particularly useful in polymerization process include one or more of:
dimethylsilylene-bis(2-cyclopropyl-4-phenylindenyl)zirconium dichloride; dimethylsilylene-bis(2-cyclopropyl-4-phenylindenyl)hafnium dichloride; dimethylsilylene-bis(2-methyl-4-phenylindenyl)zirconium dichloride; dimethylsilylene-bis(2-methyl-4-phenylindenyl)hafnium dichloride; dimethylsilylene-bis(2-methyl-4-orthobiphenylindenyl)hafnium dichloride; dimethylsilylene-bis(2-methyl-4-orthobiphenylindenyl)zirconium dichloride; dimethylsilylene-(2-cyclopropyl-4-orthobiphenylindenyl)(2-methyl-4-3',5'-di-t-butylphenylindenyl)hafnium dichloride; dimethylsilylene-(2-cyclopropyl-4-orthobiphenylindenyl)(2-methyl-4-3',5'-di-t-butylphenylindenyl)zirconium dichloride; dimethylsilylene-(2-isopropyl-4(4-t-butyl)phenyl)indenyl) (2-methyl-4-phenyl indenyl) zirconium dichloride; dimethylsilylene-(2-isopropyl-4(4-t-butyl)phenyl)indenyl) (2-methyl-4-phenyl indenyl) hafnium dichloride; dimethylsilylene-(2-isopropyl-4(4-t-butyl)phenyl)indenyl) (2-methyl, 4-t-butylindenyl) zirconium dichloride; dimethylsilylene-(2-isopropyl-4(4-t-butyl)phenyl)indenyl) (2-methyl, 4-t-butylindenyl) hafnium dichloride; dimethylsilylene-(2-isopropyl-4(4-t-butyl)phenyl)indenyl) (2-methyl-4-phenylindacenyl) zirconium dichloride; dimethylsilylene-(2-isopropyl-4(4-t-butyl)phenyl)indenyl) (2-methyl-4-phenylindacenyl) hafnium dichloride; dimethylsilylene (4-o-Biphenyl-2-(1-methyl cyclohexyl)methyl-indenyl) (4-(3,5-di-tert-butylphenyl)-2-methyl-indenyl) zirconium dichloride; and dimethylsilylene (4-o-Biphenyl-2-(1-methylcyclohexyl) methyl-indenyl) (4-(3,5-di-tent-butylphenyl)-2-methyl-indenyl) hafnium dichloride; where, in alternate embodiments, the dichloride in any of the compounds listed above may be replaced with dialkyl (such as dimethyl), dialkaryl, diflouride, diiodide, or dibromide, or a combination thereof.

Illustrative, but not limiting examples of preferred biscyclopentadienyl metallocenes of the type described in Group 1 above for the invention are the racemic isomers of:

μ-(CH$_3$)$_2$ Si(indenyl)$_2$ M(Cl)$_2$
μ-(CH$_3$)$_2$ Si(indenyl)$_2$ M(CH$_3$)$_2$
μ-(CH$_3$)$_2$ Si(tetrahydroindenyl)$_2$ M(Cl)$_2$
μ-(CH$_3$)$_2$ Si(tetrahydroindenyl)$_2$ M(CH$_3$)$_2$
μ-(CH$_3$)$_2$ Si(indenyl)$_2$ M(CH$_2$CH$_3$)$_2$
μ-(C$_6$H$_5$)$_2$ C(indenyl)$_2$ M(CH$_3$)$_2$ wherein M is chosen from a group consisting of Zr and Hf.

Illustrative, but not limiting examples of preferred unsymmetrical cyclopentadienyl metallocenes of the type described in Group 1 above for the invention are:

μ-(C$_6$H$_5$)$_2$ C(cyclopentadienyl)(fluorenyl)M(R)$_2$
μ-(C$_6$H$_5$)$_2$ C(3-methylcyclopentadienyl)(fluorenyl)M(R)$_2$
μ-(CH$_3$)$_2$ C(cyclopentadienyl)(fluorenyl)M(R)$_2$
μ-(C$_6$H$_5$)$_2$ C(cyclopentadienyl)(2-methylindenyl)M(R)$_2$
μ-(C$_6$H$_5$)$_2$ C(3-methylcyclopentadienyl)(2-methylindenyl) M(R)$_2$
μ-(p-triethylsilylphenyl)$_2$ C(cyclopentadienyl)(3,8-di-t-butylfluorenyl) M(R)$_2$
μ-(C$_6$H$_5$)$_2$ C(cyclopentadienyl)(2,7-dimethylindenyl)M(R)$_2$
μ-(CH$_3$)$_2$ C(cyclopentadienyl)(2,7-dimethylindenyl)M(R)$_2$.

wherein M is chosen from the group consisting of Zr and Hf and R is chosen from the group consisting of Cl and CH$_3$.

Illustrative, but not limiting examples of preferred monocyclopentadienyl metallocenes of the type described in group 2 above for the invention are:

μ-(CH$_3$)$_2$ Si(cyclopentadienyl)(1-adamantylamido)M(R)$_2$
μ-(CH$_3$)$_2$ Si(3-tertbutylcyclopentadienyl)(1-adamantylamido)M(R)$_2$
μ-(CH$_3$)$_2$ Si(tetramethylcyclopentadienyl)(1-adamantylamido)M(R)$_2$
μ-(CH$_3$)$_2$ C(tetramethylcyclopentadienyl)(1-adamantylamido)M(R)$_2$
μ-(CH$_3$)$_2$ Si(tetramethylcyclopentadienyl)(1-tertbutylamido)M(R)$_2$
μ-(CH$_3$)$_2$ Si(fluorenyl)(1-tertbutylamido)M(R)$_2$
μ-(CH$_3$)$_2$ Si(tetramethylcyclopentadienyl)(1-cyclododecylamido)M(R)$_2$
μ-(CH$_3$)$_2$ C(tetramethylcyclopentadienyl)(1-cyclododecylamido)M(R)$_2$ wherein M is selected from a group consisting of Ti, Zr, and Hf and wherein R is selected from Cl and CH$_3$.

In a preferred embodiment in any of the processes described herein, one metallocene compound may be used, e.g., the metallocene compounds are not different. For purposes of this invention one metallocene compound is considered different from another if they differ by at least one atom. For example "bisindenyl zirconium dichloride" is different from (indenyl)(2-methylindenyl) zirconium dichloride" which is different from "(indenyl)(2-methylindenyl) hafnium dichloride." Metallocene compounds that differ only by isomer are considered the same for purposes of this invention, e.g., rac-dimethylsilylbis(2-methyl 4-phenyl)hafnium dimethyl is considered to be the same as meso-dimethylsilylbis(2-methyl 4-phenyl)hafnium dimethyl.

Pyridyldiamido Compound

The term "pyridyldiamido compound," "pyridyldiamido complex" or "pyridyldiamide complex" or "pyridyldiamido catalyst" or "pyridyldiamide catalyst" refers to a class of coordination complexes described in U.S. Pat. No. 7,973, 116, US 2012/0071616, US 2011/0224391, US 2011/ 0301310, US 2014/0221587, US 2014/0256893, US 2014/ 0316089, US 2015/0141590, and US 2015/0141601, incorporated herein by reference, that feature a dianionic tridentate ligand that is coordinated to a metal center through one neutral Lewis basic donor atom (e.g., a pyridine group) and a pair of anionic amido or phosphido (i.e., deprotonated amine or phosphine) donors. In these complexes, the pyridyldiamido ligand is coordinated to the metal with the formation of one five-membered chelate ring and one seven-membered chelate ring. It is possible for additional atoms of the pyridyldiamido ligand to be coordinated to the metal without affecting the catalyst function upon activation; an example of this could be a cyclometalated substituted aryl group that forms an additional bond to the metal center.

In one aspect of the invention, the catalyst system comprises a pyridyldiamido transition metal complex represented by the Formula (A):

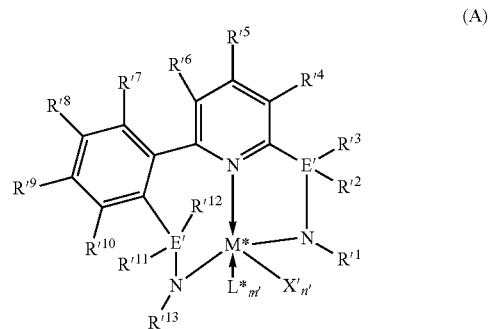

wherein:

M* is a Group 4 metal (preferably hafnium);

each E' group is independently selected from carbon, silicon, or germanium (preferably carbon);

each X' is an anionic leaving group (preferably alkyl, aryl, hydride, alkylsilane, fluoride, chloride, bromide, iodide, triflate, carboxylate, alkylsulfonate);

L* is a neutral Lewis base (preferably ether, amine, thioether);

R'$^1$ and R'$^{13}$ are independently selected from the group consisting of hydrocarbyls, substituted hydrocarbyls, and silyl groups (preferably aryl);

R'$^2$, R'$^3$, R'$^4$, R'$^5$, R'$^6$, R'$^7$, R'$^8$, R'$^9$, R'$^{10}$, R'$^{11}$, and R'$^{12}$ are independently selected from the group consisting of hydrogen, hydrocarbyls, alkoxy, silyl, amino, aryloxy, substituted hydrocarbyls, halogen, and phosphino;

n' is 1 or 2;

m' is 0, 1, or 2; and two X' groups may be joined together to form a dianionic group;

two L* groups may be joined together to form a bidentate Lewis base;

an X' group may be joined to an L* group to form a monoanionic bidentate group;

R'$^7$ and R'$^8$ may be joined to form a ring (preferably an aromatic ring, a six-membered aromatic ring with the joined R'$^7$R'$^8$ group being —CH=CHCH=CH—); and R'$^{10}$ and R'$^{11}$ may be joined to form a ring (preferably a five-membered ring with the joined R'$^{10}$R'$^{11}$ group being —CH$_2$CH$_2$—, a six-membered ring with the joined R'$^{10}$R'$^{11}$ group being —CH$_2$CH$_2$CH$_2$—).

In any embodiment described herein, M* is preferably Zr, or Hf, preferably Hf.

In any embodiment described herein, the R' groups above (R'$^1$, R'$^2$, R'$^3$, R'$^4$, R'$^5$, R'$^6$, R'$^7$, R'$^8$, R'$^9$, R'$^{10}$, R'$^{11}$ R'$^{12}$, and $R'^{13}$) preferably contain up to 30, preferably no more than 30 carbon atoms, especially from 2 to 20 carbon atoms.

In a preferred embodiment of the invention, $R'^1$ is selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In any embodiment described herein, preferably $R'^1$ and $R'^{13}$ are independently selected from phenyl groups that are variously substituted with between zero to five substituents that include F, Cl, Br, I, $CF_3$, $NO_2$, alkoxy, dialkylamino, aryl, and alkyl groups with between one to ten carbons, such as methyl, ethyl, propyl, butyl, pentyl, hexyl, heptyl, octyl, nonyl, decyl, and isomers thereof.

In any embodiment described herein, preferably E is carbon, and $R'^1$ and $R'^{13}$ are independently selected from phenyl groups that are variously substituted with between zero to five substituents that include F, Cl, Br, I, $CF_3$, $NO_2$, alkoxy, dialkylamino, hydrocarbyl, and substituted hydrocarbyls, groups with from one to ten carbons.

In any embodiment described herein, preferably $R'^1$ and $R'^{13}$ are selected from aryl or alkyl groups containing from 6 to 30 carbon atoms, especially phenyl groups. It is preferred that $R'^1$ and $R'^{13}$ be chosen from aryl or alkyl groups and that $R'^2$, $R'^3$, $R'^{11}$, and $R'^{12}$, be independently chosen from hydrogen, alkyl, and aryl groups, such as phenyl. The phenyl groups may be alkyl substituted. The alkyl substituents may be straight chain alkyls, but include branched alkyls.

Preferably, each $R'^1$ and $R'^{13}$ is a substituted phenyl group with either one or both of $R^2$ and $R^{11}$ being substituted with a group containing between one to ten carbons. Some specific examples would include, $R^1$ and $R^{13}$ being chosen from a group including 2-methylphenyl, 2-isopropylphenyl, 2-ethylphenyl, 2,6-dimethylphenyl, mesityl, 2,6-diethylphenyl, and 2,6-diisopropylphenyl.

In a preferred embodiment, $R'^7$ and $R'^8$ may be joined to form a four- to ten-membered ring. One example has the $R'^7R'^8$ group being —CH=CHCH=CH—, with the formation of an aromatic six-membered ring.

In a preferred embodiment, $R'^{10}$ and $R'^{11}$ may be joined to form a four- to ten-membered ring. One specific example has the $R'^{10}R'^{11}$ group being —$CH_2CH_2$—, with the formation of a five-membered ring. Another example has the $R'^{10}R'^{11}$ being —$CH_2CH_2CH_2$—, with the formation of a six-membered ring.

In a preferred embodiment, E' is carbon.

In a preferred embodiment, $R'^2$ is an aromatic hydrocarbyl group containing between 6 to 12 carbon atoms and $R'^{13}$ is a saturated hydrocarbon containing between 3 to 12 carbon atoms. A specific example has $R'^2$=2-isopropylphenyl and $R'^{13}$=cyclohexyl.

In any embodiment described herein, $R'^2$, $R'^3$, $R'^4$, $R'^5$, $R'^6$, $R'^7$, $R'^8$, $R'^9$, $R'^{10}$, $R'^{11}$, and $R'^{12}$ may be hydrogen or alkyl from 1 to 4 carbon atoms. Preferably 0, 1, or 2 of $R'^2$, $R'^3$, $R'^4$, $R'^5$, $R'^6$, $R'^7$, $R'^8$, $R'^9$, $R'^{10}$, $R'^{11}$, and $R'^{12}$ are alkyl substituents.

In any embodiment described herein, preferably X' is selected from alkyl, aryl, hydride, alkylsilane, fluoride, chloride, bromide, iodide, triflate, carboxylate, alkylsulfonate, alkoxy, amido, hydrido, phenoxy, hydroxy, silyl, allyl, alkenyl, and alkynyl.

In any embodiment described herein, preferably L* is selected from ethers, thio-ethers, amines, nitriles, imines, pyridines, and phosphines, preferably ethers.

In one aspect of the invention, catalyst system comprises a pyridyldiamido transition metal complex represented by the Formula (I):

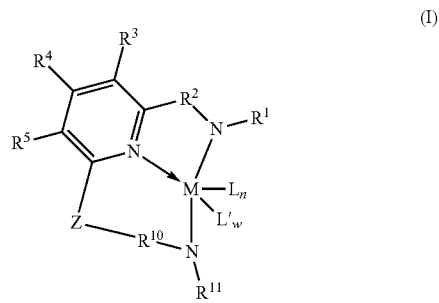

M is a Group 4 metal, preferably a group 4 metal, more preferably Ti, Zr or Hf;

Z is —$(R^{14})_p$C—$C(R^{15})_q$—, where $R^{14}$ and $R^{15}$ are independently selected from the group consisting of hydrogen, hydrocarbyls, and substituted hydrocarbyls, (preferably hydrogen and alkyls), and wherein adjacent $R^{14}$ and $R^{15}$ groups may be joined to form an aromatic or saturated, substituted or unsubstituted hydrocarbyl ring, where the ring has 5, 6, 7, or 8 ring carbon atoms and where substitutions on the ring can join to form additional rings, p is 1 or 2, and q is 1 or 2;

$R^1$ and $R^{11}$ are independently selected from the group consisting of hydrocarbyls, substituted hydrocarbyls, and silyl groups (preferably alkyl, aryl, heteroaryl, and silyl groups);

$R^2$ and $R^{10}$ are each, independently, -E($R^{12}$)($R^{13}$)— with E being carbon, silicon, or germanium, and each $R^{12}$ and $R^{13}$ being independently selected from the group consisting of hydrogen, hydrocarbyl, and substituted hydrocarbyl, alkoxy, silyl, amino, aryloxy, halogen, and phosphino (preferably hydrogen, alkyl, aryl, alkoxy, silyl, amino, aryloxy, heteroaryl, halogen, and phosphino), $R^{12}$ and $R^{13}$ may be joined to each other or to $R^{14}$ or $R^{15}$ to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, (preferably hydrogen, alkyl, alkoxy, aryloxy, halogen, amino, silyl, and aryl), and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 1 or 2;

L' is a neutral Lewis base; and w is 0, 1, or 2.

In another preferred embodiment, Z is defined as an aryl so that the complex is represented by the Formula (II):

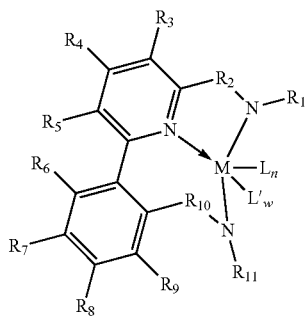

(II)

wherein:
$R^6$, $R^7$, $R^8$, and $R^9$ are independently selected from the group consisting of hydrogen, hydrocarbyls, substituted hydrocarbyls, alkoxy, halogen, amino, and silyl, and the pairs of positions, and wherein adjacent R groups ($R^6$&$R^7$, and/or $R^7$&$R^8$, and/or $R^8$&$R^9$, and/or $R^9$&$R^{10}$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R^1$, $R^2$, $R^3$, $R^4$, $R^5$, $R^6$, $R^{10}$, and $R^{11}$ are as defined above.

In a more preferred embodiment, the pyridyldiamido complexes useful in this invention are represented by the Formula (III):

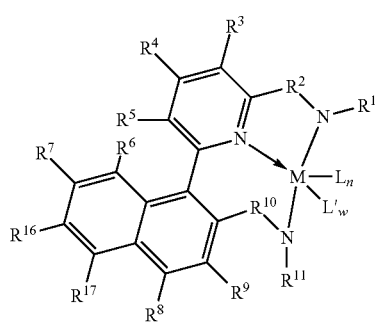

(III)

wherein:
$R^{16}$ and $R^{17}$ are independently selected from the group consisting of hydrogen, hydrocarbyls, substituted hydrocarbyls, alkoxy, halogen, amino, and silyl, and wherein adjacent R groups ($R^6$ & $R^7$ and/or $R^7$ & $R^{16}$ and/or $R^{16}$ & $R^{17}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R^1$, $R^2$, $R^3$, $R^4$, $R^5$, $R^6$, $R^7$, $R^8$, $R^9$, $R^{10}$, and $R^{11}$ are defined as above.

In any embodiment of Formula I, II, or III described herein, M is preferably Ti, Zr, or Hf, preferably HF or Zr.

In any embodiment of Formula I, II, or III described herein, the R groups above ($R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, and $R^{17}$) preferably contain up to 30 carbon atoms, preferably no more than 30 carbon atoms, especially from 2 to 20 carbon atoms.

In any embodiment of Formula I, II, or III described herein, preferably $R^1$, $R^2$, $R^3$, $R^4$, $R^5$, $R^6$, $R^7$, $R^8$, $R^9$, $R^{10}$, $R^{11}$, $R^{12}$, to $R^{13}$ contain up to 30 carbon atoms, especially from 2 to 20 carbon atoms.

In a preferred embodiment of the invention, $R^1$ is selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In any embodiment of Formula I, II, or III described herein, preferably $R^1$ and $R^{11}$ are independently selected from phenyl groups that are variously substituted with between zero to five substituents that include F, Cl, Br, I, $CF_3$, $NO_2$, alkoxy, dialkylamino, aryl, and alkyl groups with between one to ten carbons, such as methyl, ethyl, propyl, butyl, pentyl, hexyl, heptyl, octyl, nonyl, decyl, and isomers thereof.

In any embodiment of Formula I, II, or III described herein, preferably E is carbon, and $R^1$ and $R^{11}$ are independently selected from phenyl groups that are variously substituted with between zero to five substituents that include F, Cl, Br, I, $CF_3$, $NO_2$, alkoxy, dialkylamino, hydrocarbyl, and substituted hydrocarbyls, groups with from one to ten carbons.

In any embodiment of Formula I, II, or III described herein, preferably $R^1$ and $R^{11}$ are selected from aryl or alkyl groups containing from 6 to 30 carbon atoms, especially phenyl groups. It is preferred that $R^1$ and $R^{11}$ be chosen from aryl or alkyl groups and that $R^{12}$, $R^{13}$, $R^{14}$, and $R^{15}$, be independently chosen from hydrogen, alkyl, and aryl groups, such as phenyl. The phenyl groups may be alkyl substituted. The alkyl substituents may be straight chain alkyls, but include branched alkyls.

Preferably, each $R^1$ and $R^{11}$ is a substituted phenyl group with either one or both of the carbons adjacent to the carbon joined to the amido nitrogen being substituted with a group containing between one to ten carbons. Some specific examples would include $R^1$ and $R^{11}$ being chosen from a group including 2-methylphenyl, 2-isopropylphenyl, 2-ethylphenyl, 2,6-dimethylphenyl, mesityl, 2,6-diethylphenyl, and 2,6-diisopropylphenyl.

In any embodiment of Formula I, II, or III described herein, $R^2$ is preferably selected from moieties where E is carbon, especially a moiety —C($R^{12}$)($R^{13}$)— where $R^{12}$ is hydrogen and $R^{13}$ is an aryl group or a benzyl group (preferably a phenyl ring linked through an alkylene moiety such as methylene to the C atom). The phenyl group may then be substituted as discussed above. Useful $R^2$ groups include $CH_2$, $CMe_2$, $SiMe_2$, $SiEt_2$, $SiPr_2$, $SiBu_2$, $SiPh_2$, $Si(aryl)_2$, $Si(alkyl)_2$, CH(aryl), CH(Ph), CH(alkyl), and CH(2-isopropylphenyl).

In any embodiment of Formula I, II, or III described herein, $R^{10}$ is preferably selected from moieties where E is carbon, especially a moiety —C($R^{12}$)($R^{13}$)— where $R^{12}$ is hydrogen and $R^{13}$ is an aryl group or a benzyl group (preferably a phenyl ring linked through an alkylene moiety such as methylene to the C atom). The phenyl group may then be substituted as discussed above. Useful $R^{10}$ groups include $CH_2$, $CMe_2$, $SiMe_2$, $SiEt_2$, $SiPr_2$, $SiBu_2$, $SiPh_2$, $Si(aryl)_2$, $Si(alkyl)_2$, CH(aryl), CH(Ph), CH(alkyl), and CH(2-isopropylphenyl).

In any embodiment of Formula I, II, or III described herein $R^{10}$ and $R^2$ are selected from $CH_2$, $CMe_2$, $SiMe_2$, $SiEt_2$, $SiPr_2$, $SiBu_2$, $SiPh_2$, $Si(aryl)_2$, $Si(alkyl)_2$, CH(aryl), CH(Ph), CH(alkyl), and CH(2-isopropylphenyl).

In any embodiment of Formula I, II, or III described herein, $R^3$, $R^4$, $R^5$, $R^6$, $R^7$, $R^8$, and $R^9$ may be hydrogen or alkyl from 1 to 4 carbon atoms. Preferably 0, 1, or 2 of $R^3$, $R^4$, $R^5$, $R^6$, $R^7$, $R^8$, and $R^9$ are alkyl substituents.

In any embodiment of Formula I, II, or III described herein, $R^3, R^4, R^5, R^6, R^7, R^8, R^9, R^{12}, R^{13}, R^{14}$, and $R^{15}$ are, independently, hydrogen, a $C_1$ to $C_{20}$ alkyl, preferably methyl, ethyl, propyl, butyl, pentyl, hexyl, heptyl, octyl, nonyl, decyl, undecyl, dodecyl, or an isomer thereof), or a $C_5$ to $C_{40}$ aryl group (preferably a $C_6$ to $C_{20}$ aryl group, preferably phenyl or substituted phenyl or an isomer thereof, preferably phenyl, 2-isopropylphenyl, or 2-tertbutylphenyl).

In any embodiment of Formula I, II, or III described herein, preferably L is selected from halide, alkyl, aryl, alkoxy, amido, hydrido, phenoxy, hydroxy, silyl, allyl, alkenyl, and alkynyl.

In any embodiment of Formula I, II, or III described herein, preferably L' is selected from ethers, thio-ethers, amines, nitriles, imines, pyridines, and phosphines, preferably ethers.

The pyridyldiamido-metal complex is coordinated at the metal center as a tridentate ligand through two amido donors and one pyridyl donor. The metal center, M or M*, is a transition metal from Group 4. While in its use as a catalyst, according to current theory, the metal center is preferably in its four valent state, it is possible to create compounds in which M has a reduced valency state and regains its formal valency state upon preparation of the catalyst system by contacting with an activator (e.g., the organoaluminum treated layered silicate). Preferably, in addition to the pyridyldiamido ligand, the metal M or M* is also coordinated to n number of anionic ligands, with n being from 1 or 2. The anionic donors are typically halide or alkyl, but a wide range of other anionic groups are possible, including some that are covalently linked together to form molecules that could be considered dianionic, such as oxalate. For certain complexes, it is likely that up to three neutral Lewis bases (L or L*), typically ethers, could also be coordinated to the metal center. In a preferred embodiment, w is 0, 1, or 2.

In a preferred embodiment, L or L* may be selected from halide, alkyl, aryl, alkoxy, amido, hydrido, phenoxy, hydroxy, silyl, allyl, alkenyl, and alkynyl. The selection of the leaving groups depends on the synthesis route adopted for arriving at the complex and may be changed by additional reactions to suit the later activation method in polymerization. For example, a preferred L or L* group is alkyl when using non-coordinating anions such as N,N-dimethylanilinium tetrakis(pentafluorophenyl)-borate or tris(pentafluorophenyl)borane. In another embodiment, two L or two L* groups may be linked to form a dianionic leaving group, for example, oxalate.

In a preferred embodiment, X may be selected from halide, alkyl, aryl, alkoxy, amido, hydrido, phenoxy, hydroxy, silyl, allyl, alkenyl, and alkynyl. The selection of the leaving groups depends on the synthesis route adopted for arriving at the complex and may be changed by additional reactions to suit the later activation method in polymerization. For example, a preferred X is alkyl when using non-coordinating anions such as N,N-dimethylanilinium tetrakis(pentafluorophenyl)-borate or tris(pentafluorophenyl) borane. In another embodiment, two X groups may be linked to form a dianionic leaving group, for example, oxalate.

In another embodiment, each L* is independently selected from the group consisting of ethers, thio-ethers, amines, nitriles, imines, pyridines, and phosphines, preferably ethers.

Preferred compounds useful as catalysts herein include the pyridyldiamide complexes A through D shown below:

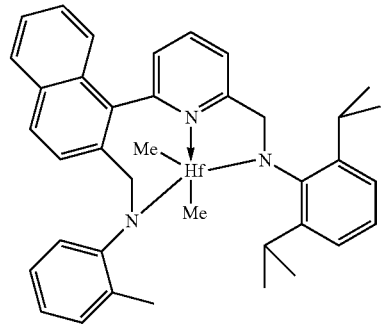

A

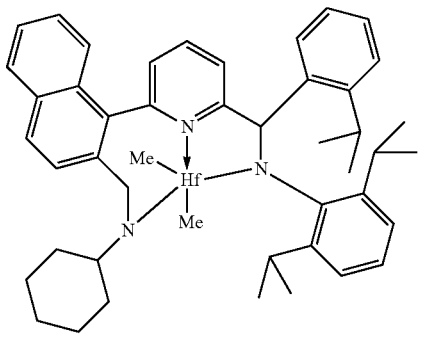

B

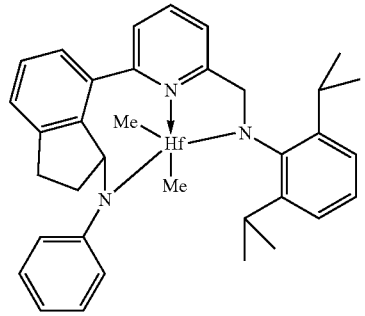

C

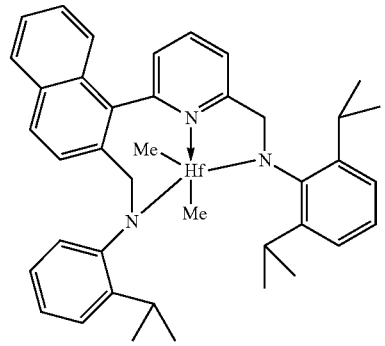

D

In one embodiment, the invention can be used with any Ziegler-Natta, chromium catalyst or any other organometallic catalyst capable of polymerizing olefins, especially in a solution process. Ziegler-Natta type catalysts are catalyst compositions that incorporate Ziegler-Natta transition metal components. Typically, the transition metal component is a compound of a Group 4, 5, or 6 metal. The transition metal component is generally represented by any one of the formulas: $TrX_{4-q}(OR^1)_q$, $TrX_{4-q}R_q^2$, $VOX_3$, and $VO(OR^1)_3$, wherein Tr is a Group 4, 5, or 6 metal, preferably a Group 5 or 6 metal, and more preferably titanium, vanadium or zirconium, q is 0 or a number equal to or less than 4, X is a halogen and $R^1$ is an alkyl group, aryl group or cycloalkyl group having from 1 to 20 carbon atoms, and $R^2$ is an alkyl group, aryl group, aralkyl group, substituted aralkyl group, and the like. The aryl, aralkyls, and substituted aralkyls contain from 1 to 20 carbon atoms, preferably 1 to 10 carbon atoms. In a preferred embodiment of the formula $TrX_{4-q}R_q^2$, the hydrocarbyl group, $R^2$, does not contain an H atom in the beta position. Illustrative, but non-limiting examples of alkyl groups are methyl, neo-pentyl, 2,2-dimethylbutyl, 2,2-dimethylhexyl; aryl groups such as phenyl, naphthyl; aralkyl groups such as benzyl; cycloalkyl groups such as 1-norbornyl. Mixtures of these transition metal compounds can be employed if desired.

Illustrative examples of titanium compounds include: $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_{12}H_{25})Cl_3$, $Ti(OC_2H_5)_2Br_2$, and $Ti(OC_8H_{17})_2Br_2$. Illustrative examples of vanadium compounds include: $VCl_4$, $VOCl_3$, $VO(OC_2H_5)_3$, and $VO(OC_4H_9)_3$. Illustrative examples of zirconium compounds include: $ZrCl_4$, $ZrCl_3(OC_2H_5)$, $ZrCl_2(OC_2H_5)_2$, $ZrCl(OC_2H_5)_3$, $Zr(OC_2H_5)_4$, $ZrCl_3(OC_4H_9)$, $ZrCl_2(OC_4H_9)_2$, and $ZrCl(OC_4H_9)_3$.

This invention can also be used with chromium catalysts that are also well known in the art. Chromium catalysts is referred to olefin polymerization catalysts comprising a chromium species, such as silyl chromate, chromium oxide, or chromocene on a metal oxide support such as silica or alumina. Suitable cocatalysts for chromium catalysts, are well known in the art, and include for example, trialkylaluminum, alkylaluminoxane, dialkoxyalkylaluminum compounds and the like.

Activators

Metallocenes, pyridyldiamido compound and other single-site catalysts may be used in combination with some form of activator to create an active catalyst system to effect polymerization. The terms "cocatalyst" and "activator" are used herein interchangeably and are defined to be any compound which can activate any one of the catalyst compounds described above by converting the neutral catalyst compound to a catalytically active catalyst compound cation.

Catalyst compounds (e.g., metallacone compounds) may be activated by combining them with activators in any manner known from the literature, including by dissolving in a solvent, contacting them in a polymerization reactor, and supporting them for use in slurry or gas phase polymerization. Non-limiting activators, for example, include alumoxanes, non-coordinating anion activators, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators may be utilized as an activator in the catalyst system. Alumoxanes are generally oligomeric compounds containing —Al(R1)-O— sub-units, where R1 is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc., under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

Non-Coordinating Anion Activators

A non-coordinating anion (NCA) is defined to mean an anion either that does not coordinate to the catalyst metal cation or that does coordinate to the metal cation, but only weakly. NCAs are described in US Patent Application No. 2015/0025209, paragraphs [0169]-[0200], incorporated herein by reference.

Additives

Other additives may also be used in the polymerization, as desired, such as one or more, scavengers, promoters, modifiers, chain transfer agents, co-activators, reducing agents, oxidizing agents, hydrogen, aluminum alkyls, or silanes.

Aluminum alkyl compounds, which may be utilized as scavengers or co-activators include, for example, one or more of those represented by the formula $AlR_3$, where each R is, independently, a $C_1$-$C_8$ aliphatic radical, preferably methyl, ethyl, propyl, butyl, pentyl, hexyl octyl or an isomer thereof), especially trimethylaluminum, triethylaluminum, triisobutylaluminum, tri-n-hexylaluminum, tri-n-octylaluminum, or mixtures thereof. In a preferred embodiment, little or no scavenger is used in the process to produce the polymer, such as ethylene polymer. Preferably, scavenger (such as trialkyl aluminum, $AlR_3$ as defined above) is present at zero mol %, alternately the scavenger is present at a molar ratio of scavenger metal to transition metal of less than 100:1, preferably less than 50:1, preferably less than 15:1, preferably less than 10:1.

Useful chain transfer agents that may also be used herein are typically a compound represented by the formula $AlR_3$, $ZnR_2$ (where each R is, independently, a $C_1$-$C_8$ aliphatic radical, preferably methyl, ethyl, propyl, butyl, pentyl, hexyl octyl, or an isomer thereof) or a combination thereof, such as diethyl zinc, trimethylaluminum, triisobutylaluminum, trioctylaluminum, or a combination thereof.

III. Polymerization System

Figure 5:
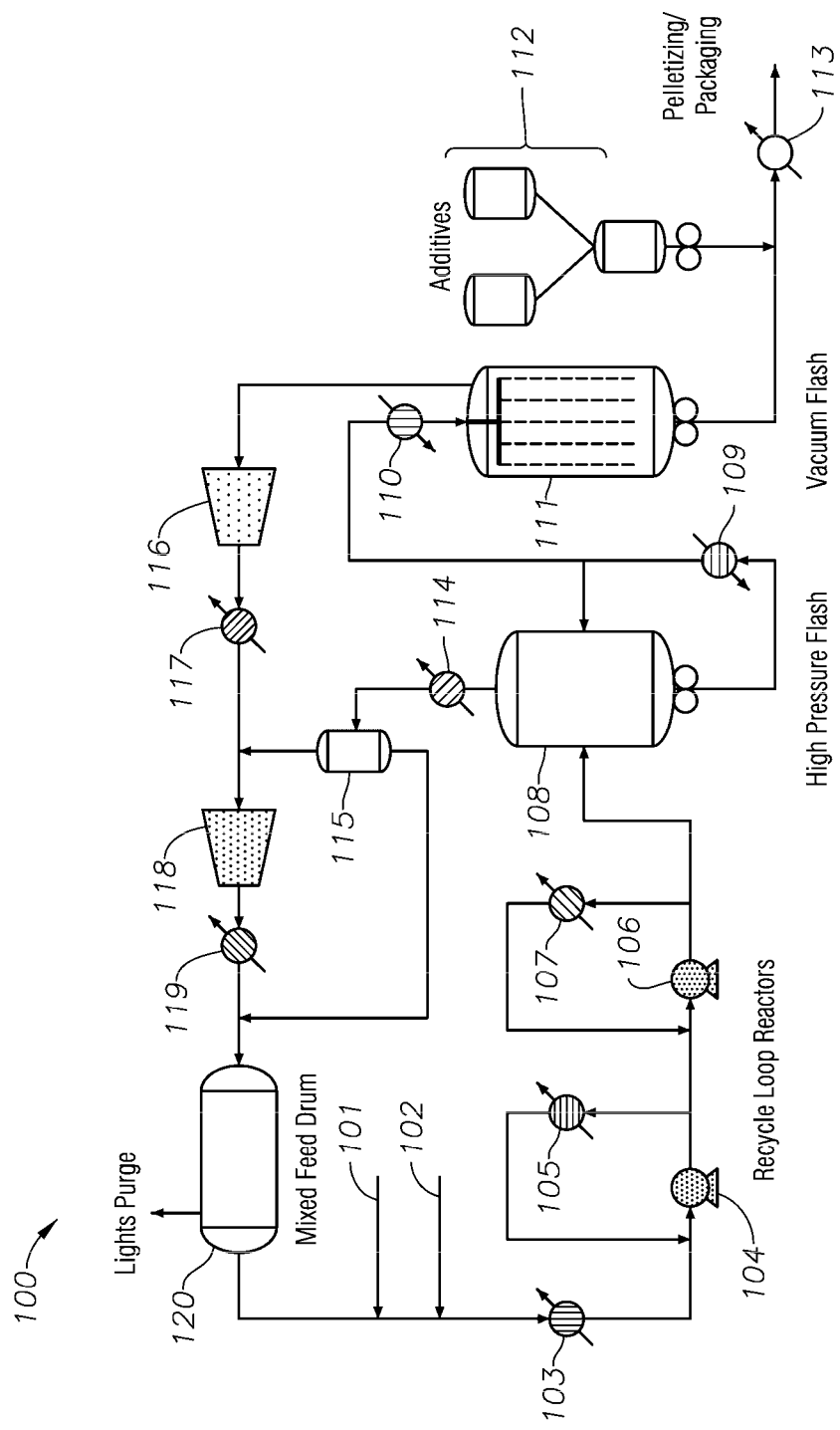
FIG. 5 is a diagram of a polymerization process system, according to another embodiment of the invention.

The following description is made with reference to FIG. 5, which provides an embodiment of an overall polymerization system 100 utilizing the processes described herein. As shown in FIG. 5, a monomer stream 101 and a catalyst compound stream 102, both as described herein may be introduced into the polymerization system 100 and mixed to form a solution. Optionally, a solvent as described above may be present. The solution of monomer and catalyst compound may travel through a chiller or heater 103 to arrive at a suitable temperature. Then the chilled or heated solution of monomer and catalyst compound may be pumped through a pump 104 into a first spiral heat exchanger 105 in a reaction zone as described herein. Prior to introduction into the first spiral heat exchanger the catalyst compound may be contacted (not shown) with an activator as described herein to form a catalyst system as described herein. Preferably, the catalyst compound is contacted with the activator immediately prior to entering the first spiral heat exchanger.

As the catalyst system contacts the monomer, in a solution, in the first spiral heat exchanger 105, polymer is obtained. The monomer, catalyst system and polymer may flow through the first spiral heat exchanger 105 in a cross-flow direction relative to spirals in the first spiral heat exchanger 105. A portion of the monomer, catalyst system and polymer exiting the first spiral heat exchanger 105 may be recycled back to the first spiral heat exchanger 105, and another portion of the monomer, catalyst system and polymer exiting the first spiral heat exchanger may be pumped via another pump 106 into a second spiral heat exchanger 107 in a reaction. A portion of the monomer, catalyst system and polymer exiting the second spiral heat exchanger 107 may be recycled back to the second spiral heat exchanger 107, and another portion of the monomer, catalyst system and polymer exiting the second spiral heat exchanger 107 may be transferred to a high pressure flash vessel 108. Additionally or alternatively, the activator may be introduced in the recycle streams (not shown).

In the high pressure flash vessel 108, monomer and/or solvent is separated from polymer. A concentrated polymer solution (greater than 30 wt %, preferably greater than 50 wt %, preferably greater than about 80 wt % polymer, based upon the weight of the solution) may exit the bottom of the high pressure flash vessel 108 and be transferred to a heater 109 to form a heated concentrated polymer solution. A portion of the heated concentrated polymer solution may be recycled to the high pressure flash vessel 108. A remaining portion of the heated concentrated polymer solution may be further heated in a heater 110 to maintain the heated concentrated polymer solution in a molten phase, and then transferred to vacuum flash vessel 111 to remove any remaining monomer and/or solvent from the heated concentrated polymer solution. A more concentrated polymer solution (up to about 100% polymer) may exit the bottom of the vacuum flash vessel 111, where it may be mixed with further suitable additives 112 as described herein, chilled in a chiller 113 and then sent to pelletizing and packaging.

The monomer and solvent exiting the top of the high pressure flash vessel 108 may then be cooled in a chiller 114 and transferred to a condenser 115. Condensed monomer and/or solvent may exit the bottom of the condenser 115 and be transferred to a mixed feed drum 120, so that it may be fed back into the system. Noncondensable gases (e.g., hydrogen gas, ethylene gas) may exit the top of the condenser 115 and be transferred to a compressor 118 and another chiller 119 to convert the gases to liquids, which may then be transferred to the mixed feed drum 120 for use again in the system. Similarly, the monomer and/or solvent exiting the top of the vacuum flash vessel 111 may be run through a compressor 116, another chiller 117, the compressor 118 and the chiller 119 to form a liquid, which may then be transferred to the mixed feed drum 120 for use again in the system.

In an embodiment of the present invention, the polymer systems described herein comprising a spiral heat exchanger can be simulated on a computer using process simulation software in order to generate process simulation data in a human-readable form (i.e., a computer printout or data displayed on a screen, a monitor, or other viewing device). The simulation data can then be used to manipulate the operation of the polymer production system and/or design the physical layout of a polymer production facility. In one embodiment, the simulation results can be used to design a new polymer production facility comprising a spiral heat exchanger and/or revamp or expand an existing facility to integrate spiral heat exchanger(s). In another embodiment, the simulation results can be used to optimize the polymer production according to one or more operating parameters, such as varying the number and placement of spiral heat exchangers, and/or varying temperature, solvent or solution viscosities of the reaction mass. Examples of suitable software for producing the simulation results include commercial simulation software Aspen Plus v8.8 (34.0.0.110) with Aspen Polymers Module integrated from Aspen Technology, Inc., and PRO/II® from Simulation Sciences Inc.

IV. Further Embodiments

Embodiment 1. A polymerization process (e.g., solution phase, slurry phase) for forming polymer comprising: contacting a monomer (e.g., $C_2$ to $C_{40}$ olefins) and a catalyst system (e.g., catalyst compound, such as a metallocene compound and/or a pyridyldiamido compound, and an activator) in a reaction zone comprising at least one spiral heat exchanger and recovering polymer, wherein the monomer, the catalyst system and polymer flow through the at least one spiral heat exchanger in a cross-flow direction relative to spirals of the at least one spiral heat exchanger, optionally, wherein the process is a continuous process, optionally wherein, a solvent is present, and optionally wherein, a pressure drop across the at least one spiral heat exchanger is less than or equal to about 10 psi.

Embodiment 2. The process of embodiment 1, wherein the at least one spiral heat exchanger removes heat at a rate of about 400 Btu/hour·cubic foot·° F. (7450 W/cubic meter·° C.) and/or a pressure drop across the at least one spiral heat exchanger is less than or equal to about 10 psi.

Embodiment 3. The process of embodiment 1 or 2, wherein the flow of the monomer, the catalyst system, and polymer is substantially laminar and/or the Reynolds number of the flow of the monomer, the catalyst system, and polymer is about 0.1 to about 2,200.

Embodiment 4. The process of any one of the previous embodiments, further comprising recycling at least a portion of the monomer, the catalyst system and polymer exiting the at least one spiral heat exchanger back through a spiral heat exchanger, which may be the same or different spiral heat exchanger and/or wherein polymer is produced with a recycle ratio of at least about 5 or from about 0.5 to about 20.

Embodiment 5. The process of any one of the previous embodiments, wherein the monomer, the catalyst system, and polymer are maintained substantially as a single liquid phase solution.

Embodiment 6. The process of any one of the previous embodiments, wherein polymer is produced at a rate of at least about 5, about 10 or about 20 pounds per hour per gallon of reactor volume (equivalent to about 600, about 1200 or about 2400 grams per hour per liter of reactor volume).

Embodiment 7. The process of any one of the previous embodiments, wherein the at least one spiral heat exchanger comprises at least eight spiral heat exchangers connected in series.

Embodiment 8. The process of any one of the previous embodiments, wherein the monomer comprises $C_2$ to $C_{40}$ olefin (e.g., ethylene, propylene, butene, pentene, hexene, heptene, octene, nonene, decene, undecene, and dodecene).

Embodiment 9. The process of any one of the previous embodiments, wherein polymer is an ethylene polymer or a propylene polymer and/or polymer further comprises $C_2$ to $C_{20}$ comonomer (e.g., ethylene, propylene, butene, pentene, hexene, heptene, octene, nonene, decene, undecene, dodecene, and a mixture thereof).

Embodiment 10. The process of any one of the previous embodiments, wherein the activator and the catalyst compound are contacted to form the catalyst system prior to entering (e.g., immediately prior to entering) the at least one spiral heat exchanger and/or wherein the activator is introduced to a recycle stream comprising the monomer, the catalyst system and polymer.

Embodiment 11. The process of any one of the previous embodiments, wherein the activator comprises alumoxane, methylalumoxane and/or a non-coordinating anion activator.

Embodiment 12. The process of any one of the previous embodiments, wherein the activator comprises methylalumoxane, ethylalumoxane, N,N-dimethylanilinium tetrakis(pentafluorophenyl) borate, triphenylcarbenium tetrakis(pentafluorophenyl)borate, N,N-dimethylanilinium tetrakis(perfluoronaphthyl)borate, and/or triphenylcarbenium tetrakis(perfluoronaphthyl)borate.

Embodiment 13. The process of any one of the previous embodiments, wherein the metallocene compound is represented by the formula: $T_yCp_mMG_nX_q$ wherein each Cp is, independently, a cyclopentadienyl group (e.g., cyclopentadiene, indene, fluorene) which may be substituted or unsubstituted, M is a group 4 transition metal (e.g., titanium, zirconium, hafnium), G is a heteroatom group represented by the formula $JR^*_z$, where J is N, P, O, or S, and R* is a linear branched or cyclic hydrocarbyl group having from one to twenty carbon atoms and z is 1 or 2, T is a bridging group, and y is 0 or 1, X is a leaving group (e.g., independently a halide, a hydride, an alkyl group, an alkenyl group, an arylalkyl group), and m=1 or 2, n=0, 1, 2, or 3, q=0, 1, 2, or 3, and the sum of m+n+q is equal to the oxidation state of the transition metal.

Embodiment 14. The process of embodiment 13, wherein y is 1, m is one, n is one, J is N, and R* is methyl, ethyl, propyl, butyl, pentyl, hexyl, heptyl, octyl, nonyl, cyclooctyl, cyclododecyl, decyl, undecyl, dodecyl, adamantyl, or an isomer thereof.

Embodiment 15. The process of any one of the previous embodiments, wherein the metallocene compound comprises one or more of:
dimethylsilyl (tetramethylcyclopentadienyl)(cyclododecylamido)titanium dimethyl; dimethylsilyl (tetramethylcyclopentadienyl)(cyclododecylamido)titanium dichloride; dimethylsilyl (tetramethylcyclopentadienyl)(t-butylamido)titanium dimethyl; dimethylsilyl (tetramethylcyclopentadienyl)(t-butylamido)titanium dichloride; µ-$(CH_3)_2$Si(cyclopentadienyl)(1-adamantylamido)M(R)$_2$; µ-$(CH_3)_2$Si(3-tertbutylcyclopentadienyl)(1-adamantylamido)M(R)$_2$; µ-$(CH_3)_2$(tetramethylcyclopentadienyl)(1-adamantylamido)M(R)$_2$; µ-$(CH_3)_2$Si(tetramethylcyclopentadienyl)(1-adamantylamido)M(R)$_2$; µ-$(CH_3)_2$C(tetramethylcyclopentadienyl)(1-adamantylamido)M(R)$_2$; µ-$(CH_3)_2$Si(tetramethylcyclopentadienyl)(1-tertbutylamido)M(R)$_2$; µ-$(CH_3)_2$Si(fluorenyl)(1-tertbutylamido)M(R)$_2$; µ-$(CH_3)_2$Si(tetramethylcyclopentadienyl)(1-cyclododecylamido)M(R)$_2$; and µ-$(C_6H_5)_2$C(tetramethylcyclopentadienyl)(1-cyclododecylamido)M(R)$_2$;

wherein M is selected from a group consisting of Ti, Zr, and Hf and R is selected from halogen or C1 to C5 alkyl: and/or one or more of: Bis(tetrahydroindenyl)HfMe$_2$; Bis(1-butyl, 3-methyl cyclopentadienyl)ZrCl$_2$, Bis-(n-butylcyclopentadienyl)ZrCl$_2$, (Dimethylsilyl)$_2$O bis(indenyl)ZrCl$_2$; Dimethylsilyl(3-(3-methylbutyl)cyclopentadienyl)(2,3,4,5-tetramethylcyclopentadienyl)ZrCl$_2$; Dimethylsilylbis(tetrahydroindenyl)ZrCl$_2$; Dimethylsilyl-(3-phenyl-indenyl)(tetramethylcyclopentadienyl)ZrCl$_2$; Dimethylsilyl(3-neopentylcyclopentadienyl)(tetramethylcyclopentadienyl)HfCl$_2$;
Tetramethyldisilylene bis(4-(3,5-di-tert-butylphenyl)-indenyl)ZrCl$_2$; Cyclopentadienyl(1,3-diphenylcyclopentadienyl)ZrCl$_2$; bis(cyclopentadienyl)zirconium dichloride; bis(pentamethylcyclopentadienyl)zirconium dichloride; bis(pentamethylcyclopentadienyl)zirconium dimethyl; is(pentamethylcyclopentadienyl)hafnium dichloride; bis(pentamethylcyclopentadienyl)zirconium dimethyl; bis(1-methyl-3-n-butylcyclopentadienyl)zirconium dichloride; bis(1-methyl-3-n-butylcyclopentadienyl)zirconium dimethyl; bis(1-methyl-3-n-butylcyclopentadienyl)hafnium dichloride; bis(1-methyl-3-n-butylcyclopentadienyl)zirconium dimethyl; bis(indenyl)zirconium dichloride; bis(indenyl)zirconium dimethyl; bis(tetrahydro-1-indenyl)zirconium dichloride;
bis(tetrahydro-1-indenyl)zirconium dimethyl; dimethylsilylbis(tetrahydroindenyl)zirconium dichloride; dimethylsilylbis(tetrahydroindenyl)zirconium dimethyl; dimethylsilylbis(indenyl)zirconium dichloride; dimethylsilyl(bisindenyl)zirconium dimethyl; dimethylsilylbis(cyclopentadienyl)zirconium dichloride; dimethylsilylbis(cyclopentadienyl)zirconium dimethyl; dimethylsilylbis(2-methyl-4-phenyl indenyl)zirconium dichloride; dimethylsilylbis(2-methyl-4-phenyl indenyl)zirconium dimethyl;
bis(indenyl)zirconium dichloride; bis(indenyl)zirconium dimethyl; bis(indenyl)hafnium dichloride; bis(indenyl)hafnium dimethyl; 1,1'-bis(4-triethylsilylphenyl)methylene-(cyclopentadienyl)(3,8-di-tertiary-butyl-1-fluorenyl) hafnium dimethyl; and 1,1'-bis(4-triethylsilylphenyl)methylene-(cyclopentadienyl)(3,8-di-tertiary-butyl-1-fluorenyl)hafnium dichloride.

Embodiment 16. The process of any one of the previous embodiments, wherein two metallocene compounds are present and the first and second metallocene compounds comprise one or more of: SiMe$_2$(Me$_4$Cp)(cC$_{12}$N)TiMe$_2$ and bis(1-Bu,3-Me-Cp) ZrCl$_2$;
SiMe$_2$(Me$_4$Cp)(cC$_{12}$N)TiMe$_2$ and (SiMe$_2$) bis(indenyl)ZrCl$_2$; SiMe$_2$(Me$_4$Cp)(cC$_{12}$N)TiMe$_2$ and (SiMe$_2$)$_2$O bis(indenyl)ZrCl$_2$; SiMe$_2$(Me$_4$Cp)(cC$_{12}$N)TiMe$_2$ and (SiMe$_2$)$_2$O bis(indenyl)ZrMe$_2$; SiMe$_2$(Me$_4$Cp)(cC$_{12}$N)TiMe$_2$ and SiMe$_2$(3-neopentylCp)((Me$_4$Cp)HfCl$_2$; SiMe$_2$(Me$_4$Cp)(cC$_{12}$N)TiMe$_2$ and SiMe$_2$(3-neopentylcyclopentadienyl)(Me$_4$Cp)HfMe$_2$; SiMe$_2$(Me$_4$Cp)(1- adamantylamido)TiMe₂ and bis(1-Bu,3-MeCp)ZrCl₂; and SiMe₂(Me₄Cp)(1-t-butylamido)TiMe₂ and bis(1-Bu,3-MeCp)ZrCl₂.

Embodiment 17. The process of any one of the previous embodiments, wherein a heat exchange medium comprising oil flows through the spirals of the at least one spiral heat exchanger and/or wherein the heat exchange medium flows through spirals of the at least one spiral heat exchanger at a temperature lower than a temperature of the monomer, the catalyst system and the polymer and/or above a precipitation point of the polymer.

Embodiment 18. The process of any one of the previous embodiments, wherein the pyridyldiamido compound is represented by the Formula (A):

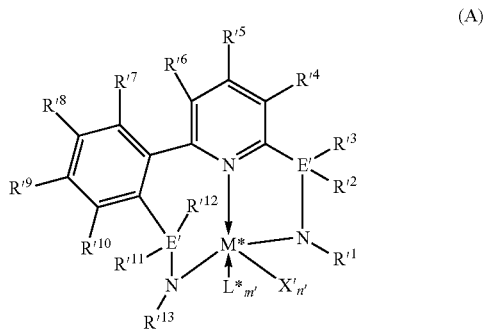

(A)

wherein:

M* is a Group 4 metal;

each E' group is independently selected from carbon, silicon, or germanium;

each X' is an anionic leaving group;

L* is a neutral Lewis base;

$R'^1$ and $R'^{13}$ are independently selected from the group consisting of hydrocarbyls, substituted hydrocarbyls, and silyl groups;

$R'^2$, $R'^3$, $R'^4$, $R'^5$, $R'^6$, $R'^7$, $R'^8$, $R'^9$, $R'^{10}$, $R'^{11}$, and $R'^{12}$ are independently selected from the group consisting of hydrogen, hydrocarbyls, alkoxy, silyl, amino, aryloxy, substituted hydrocarbyls, halogen, and phosphino;

n' is 1 or 2;

m' is 0, 1, or 2;

two X' groups may be joined together to form a dianionic group;

two L* groups may be joined together to form a bidentate Lewis base;

an X' group may be joined to an L* group to form a monoanionic bidentate group;

$R'^7$ and $R'^8$ may be joined to form a ring; and $R'^{10}$ and $R'^{11}$ may be joined to form a ring.

EXPERIMENTAL the polymerization process to produce polyolefin was simulated using the commercial simulation software Aspen Plus v8.8 (34.0.0.110) with Aspen Polymers Module integrated.

The polymerization process was first simulated using a continuous stirred-tank reactor (CSTR), the results of which serve as the benchmark for the following simulations. The polymerization process is catalyzed by coordination chemistry. In the flowsheet of CSTR simulation, the CSTR is connected with a feed stream which contains the monomers, solvent, and catalyst system and a product stream which contains the residual monomers, residual solvent, residual catalyst system, and polyolefin. The feed in all cases is 15% ethylene, 4% comonomer (hexene), 81% solvent (hexane), and 10 ppm of catalyst ((Me2Si(indenyl)ZrMe2) plus activator (N,N dimethylaniliniumtetrakis (heptafluoronaphthnyl borate), on a weight basis. (Flow rates in Table 1 below.) The kinetic rates of the polyolefin polymerization obtained from experimental data regression are input into the software. The residence time used was about 8 minutes. The reaction temperature used was 120° C. and reaction pressure used was 350 psi. After the simulation run is finished, the following parameters are calculated: reactor residence time, reactor heat duty, polyolefin yield, weight/number average molecular weight of polyolefin, polydispersity index of polyolefin, overall monomer conversion, individual monomer conversion, and polyolefin composition.

TABLE 1

| Feed Flow | |
|---|---|
| Name | kg/hr |
| Catalyst | 1.00E−06 |
| Activator | 2.92E−06 |
| ethylene | 0.605328 |
| hexane | 3.312 |
| hexene | 0.156 |

The polymerization process is then simulated using a plug flow reactor (PFR) model with a recycle loop. The PFR represents the spiral heat exchanger. In the flowsheet of PFR simulation, a feed stream is connected with a mixer which directly connects the PFR. The outlet end of the spiral heat exchanger is connected with a splitter which splits the outlet stream into two streams. One stream named reflow stream flows back to the mixer and the other stream named product stream flows out of the loop containing the generated polyolefin and residuals of monomers, solvent, and catalyst system. The diameter and length of PFR is chosen to make the volume of PFR the same as that of CSTR. All other conditions of PFR simulation including feed condition, reaction temperature, reaction pressure, reaction chemistry, and reaction kinetics are exactly the same as those of CSTR simulation. During the simulation, the recycle ratio which defines as the reflow stream flow rate over the product stream flow rate varies from zero to fifty. After each run with a certain recycle ratio, the same types of parameters as those of CSTR simulation are calculated.

The results of the spiral heat exchanger and CSTR simulations are quantitatively compared. It can be concluded that, with the increase of recycle ratio, the weight/number average molecular weight, polydispersity index, and composition of the polyolefin produced in the process with the spiral heat exchanger in recycle quickly approach those in the process with CSTR. When the recycle ratio increases to a certain range, the differences of these properties between spiral heat exchanger and CSTR processes are negligible. The reactor residence time also exactly follows the same trending. It has also been found that the reactor heat duty, polyolefin yield, and overall and individual monomer conversions in the process with PFR reactor are considerably higher than those in the process with CSTR regardless of the value of recycle ratio. When the recycle ratio increases to a certain range, the fluctuations of the values of these parameters in the proposed process are negligible.

|  | CSTR |  | PFR | | | | | | |
| --- | --- | --- | --- | --- | --- | --- | --- | --- | --- |
|  |  | Reflow Ratio | 0 | 2 | 4 | 6 | 8 | 10 | 11 |
| Configuration | 1000 ml Vol, 120° C. and 350 psig | Configuration | 1000 ml Vol, D = 4 cm, L = 80 cm, 120 C. and 350 psig | | | | | | |
| Residence Time/s | 475.419203 | Residence Time/s | 473.9391 | 324.5379 | 390.8101 | 414.7562 | 428.6557 | 438.7214 | 443.5997 |
| Heat Duty btu/hr | −369.012063 | Heat Duty btu/hr | −837.649 | −781.896 | −748.463 | −628.628 | −533.333 | −530.994 | −590.646 |
| LLDPE Flow Rate kg/hr | 0.3739179 | LLDPE Flow Rate kg/hr | 0.539786 | 0.518565 | 0.514737 | 0.478798 | 0.4492 | 0.41211 | 0.452853 |
| C2 PROD Flow Rate kg/hr | 0.2310395 | C2 PROD Flow Rate kg/hr | 0.082702 | 0.103194 | 0.114933 | 0.146961 | 0.176346 | 0.207691 | 0.170926 |
| C6 PROD Flow Rate kg/hr | 0.1428784 | C6 PROD Flow Rate kg/hr | 0.138847 | 0.132744 | 0.131508 | 0.135346 | 0.138551 | 0.141718 | 0.137465 |
| MWW | 172112 | MWW | 176618.7 | 165584.8 | 163398.7 | 166681 | 167065 | 167338.5 | 167407.9 |
| Overall Conversion/% | 50.8865165 | Overall Conversion/% | 70.89996 | 67.57314 | 67.62815 | 61.28974 | 59.05345 | 58.02858 | 59.27259 |
| C2 Conversion/% | 61.8326687 | C2 Conversion/% | 86.33783 | 82.84442 | 81.03969 | 73.96898 | 70.87281 | 70.17465 | 71.51038 |
| C6 Conversion/% | 8.41207787 | C6 Conversion/% | 10.99629 | 14.88164 | 15.61938 | 11.85645 | 11.19915 | 11.03513 | 11.85005 |
| C2 in POL/% | 96.6127024 | C2 in POL/% | 96.82201 | 97.47834 | 95.27725 | 95.95792 | 95.42306 | 96.15177 | 95.92551 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise, whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements, and vice versa.

What is claimed is:

1. A polymerization process for forming polymer comprising:
   contacting a monomer and a catalyst system in a reaction zone comprising at least one spiral heat exchanger and recovering polymer,
   wherein the monomer, the catalyst system and polymer flow through the at least one spiral heat exchanger in a cross-flow direction relative to spirals of the at least one spiral heat exchanger,
   wherein the Reynolds number of the flow of the solvent, monomer/comonomer, the catalyst system, and polymer is about 0.1 to about 2,200.

2. A polymerization process for forming polymer comprising:
   contacting a monomer and a catalyst system in a reaction zone comprising at least one spiral heat exchanger and recovering polymer,
   wherein the monomer, the catalyst system and polymer flow through the at least one spiral heat exchanger in a cross-flow direction relative to spirals of the at least one spiral heat exchanger;
   wherein the process is a solution phase process; and
   wherein a pressure drop across the at least one spiral heat exchanger is less than or equal to about 10 psi.

3. A polymerization process for forming polymer comprising:
   contacting a monomer and a catalyst system in a reaction zone comprising at least one spiral heat exchanger and recovering polymer,
   wherein the spiral heat exchanger comprises at least one spiral sheet spiraling radially around an axis of the spiral heat exchanger,
   wherein the spiral heat exchanger comprises at least one channel formed in between adjacent spiralings of the at least one spiral sheet,
   wherein the monomer, the catalyst system and polymer flow through the at least one channel in a cross-flow direction relative to spirals of the at least one spiral heat exchanger;
   wherein the catalyst system comprises a catalyst compound and an activator; and
   wherein the monomer comprises $C_2$ to $C_{40}$ olefins.

4. The polymerization process of claim 1, wherein the process is a solution phase process.

5. The polymerization process of claim 1, wherein the process is a slurry phase process.

6. The polymerization process of claim 1, wherein the at least one spiral heat exchanger removes heat at a rate of about 7450 W/·cubic meters·° C.

7. The polymerization process of claim 1, wherein a pressure drop across the at least one spiral heat exchanger is less than or equal to about 10 psi.

8. The polymerization process of claim 1, further comprising recycling at least a portion of the monomer, the catalyst system and polymer exiting the at least one spiral heat exchanger back through a spiral heat exchanger, which may be the same or different spiral heat exchanger.

9. The polymerization process of claim 1, wherein polymer is produced with a recycle ratio of at least about 5.

10. The polymerization process of claim 1, wherein polymer is produced with a recycle ratio of from about 0.5 to about 20.

11. The polymerization process of claim 1, wherein the monomer, the catalyst system, and polymer are maintained substantially as a single liquid phase solution.

12. The polymerization process of claim 1, wherein polymer is produced at a rate of at least about 600 grams per liter of reactor volume.

13. The polymerization process of claim 1, wherein the at least one spiral heat exchanger comprises at least eight spiral heat exchangers connected in series.

14. The polymerization process of claim 1, wherein the process is a continuous process.

15. The polymerization process of claim 1, wherein the monomer comprises $C_2$ to $C_{40}$ olefin.

16. The polymerization process of claim 15, wherein the $C_2$ to $C_{40}$ olefin is selected from at least one of the group consisting of ethylene, propylene, butene, pentene, hexene, heptene, octene, nonene, decene, undecene, dodecene, and mixtures thereof.

17. The polymerization process of claim 1, wherein polymer is an ethylene polymer or a propylene polymer.

18. The polymerization process of claim 17, wherein polymer further comprises $C_2$ to $C_{20}$ comonomer.

19. The polymerization process of claim 18, wherein the $C_2$ to $C_{20}$ comonomer is selected from the group consisting of ethylene, propylene, butene, pentene, hexene, heptene, octene, nonene, decene, undecene, dodecene, and a mixture thereof.

20. The polymerization process of claim 1, wherein the catalyst system comprises a catalyst compound and an activator.

21. The polymerization process of claim 1, wherein the catalyst compound comprises a pyridyldiamido compound and/or a metallocene compound.

22. The polymerization process of claim 20, wherein the activator comprises alumoxane and/or a non-coordinating anion activator.

23. The polymerization process of claim 20, wherein the activator and the catalyst compound are contacted to form the catalyst system prior to entering the at least one spiral heat exchanger.

24. The polymerization process of claim 20, wherein the activator is introduced to a recycle stream comprising the monomer, the catalyst system and polymer.

25. The polymerization process of claim 3, wherein the spiral sheet includes at least one flow channel for flow of a heat exchange medium.

* * * * *